US009866535B2

(12) United States Patent
Matsushima et al.

(10) Patent No.: US 9,866,535 B2
(45) Date of Patent: *Jan. 9, 2018

(54) CONTENT REPRODUCTION SYSTEM, INFORMATION PROCESSING TERMINAL, MEDIA SERVER, SECURE DEVICE, AND SERVER SECURE DEVICE

(71) Applicant: Panasonic Intellectual Property Management Co., Ltd., Osaka (JP)

(72) Inventors: Hideki Matsushima, Osaka (JP); Teruto Hirota, Osaka (JP); Naoyoshi Otsubo, Osaka (JP); Koichi Morioka, Osaka (JP); Natsume Matsuzaki, Osaka (JP); Norio Sanada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

This patent is subject to a terminal disclaimer.

(21) Appl. No.: 14/834,904

(22) Filed: Aug. 25, 2015

(65) Prior Publication Data

US 2015/0372992 A1   Dec. 24, 2015

Related U.S. Application Data

(62) Division of application No. 13/814,773, filed as application No. PCT/JP2012/004981 on Aug. 6, 2012, now Pat. No. 9,152,770.

(30) Foreign Application Priority Data

Sep. 13, 2011  (JP) .................................. 2011-199932

(51) Int. Cl.
  *H04L 29/06*     (2006.01)
  *G06F 21/44*     (2013.01)
  (Continued)

(52) U.S. Cl.
  CPC .......... *H04L 63/0428* (2013.01); *G06F 21/10* (2013.01); *G06F 21/121* (2013.01);
  (Continued)

(58) Field of Classification Search
  CPC ...... G06F 21/10; G06F 21/121; G06F 21/123; G06F 21/445; G06F 21/86; G06F 21/14;
  (Continued)

(56) References Cited

U.S. PATENT DOCUMENTS 6,351,809 B1   2/2002  St. Pierre et al.
7,228,423 B2   6/2007  Asai et al.
(Continued)

FOREIGN PATENT DOCUMENTS

JP    11-073381     3/1999
JP    2002-063147   2/2002
(Continued)

OTHER PUBLICATIONS

International Search Report dated Sep. 18, 2012 in International (PCT) Application No. PCT/JP2012/004981.
(Continued)

*Primary Examiner* — Catherine Thiaw
(74) *Attorney, Agent, or Firm* — Wenderoth, Lind & Ponack, L.L.P.

(57) ABSTRACT

A content reproduction system includes an information processing terminal (102) and a secure device (103). The information processing terminal (102) receives a copyright protection application program (315) from an application distribution server (113). The copyright protection application program includes a first program having a first execution format executable in the information processing terminal (102) and a second program having a second execution format different from the first execution format and executable in the secure device (103). The second program is
(Continued)

encrypted with a program key (515) held in the secure device (103). By extracting and executing the first program, the information processing terminal (102) extracts the second program and transmits the second program to the secure device (103). The secure device (103) receives the second program from the information processing terminal (102), decrypts the second program using a program key stored in a key storing unit (520), and executes the second program.

12 Claims, 13 Drawing Sheets

(51) Int. Cl.
    G06F 21/12      (2013.01)
    G06F 21/86      (2013.01)
    H04W 12/04      (2009.01)
    G06F 21/10      (2013.01)
    G06F 21/14      (2013.01)
    H04W 12/06      (2009.01)

(52) U.S. Cl.
    CPC .......... *G06F 21/123* (2013.01); *G06F 21/125* (2013.01); *G06F 21/14* (2013.01); *G06F 21/445* (2013.01); *G06F 21/86* (2013.01); *H04W 12/06* (2013.01); *H04W 12/04* (2013.01)

(58) Field of Classification Search
    CPC .. G06F 21/125; H04L 63/0428; H04W 12/04; H04W 12/06
    See application file for complete search history.

(56) References Cited

U.S. PATENT DOCUMENTS

| | | | |
|---|---|---|---|
| 7,747,870 B2 | 6/2010 | Asai et al. | |
| 7,930,537 B2* | 4/2011 | Paatero | G06F 21/10 380/278 |
| 7,937,750 B2* | 5/2011 | Mahalal | G06F 21/10 455/410 |
| 8,213,618 B2* | 7/2012 | Dewan | G06F 21/10 380/277 |
| 8,930,719 B2 | 1/2015 | Moskowitz | |
| 2004/0030911 A1 | 2/2004 | Isozaki et al. | |
| 2004/0064689 A1 | 4/2004 | Carr | |
| 2004/0123122 A1 | 6/2004 | Asai et al. | |
| 2004/0230800 A1* | 11/2004 | Futa | G06F 21/32 713/169 |
| 2004/0243810 A1* | 12/2004 | Rindborg | G06F 21/123 713/176 |
| 2006/0277607 A1 | 12/2006 | Chung | |
| 2007/0150885 A1* | 6/2007 | Jogand-Coulomb | G06F 21/10 717/174 |
| 2007/0294534 A1 | 12/2007 | Asai et al. | |
| 2008/0186525 A1 | 8/2008 | Takagi | |
| 2008/0215491 A1* | 9/2008 | Miller | G06Q 30/06 705/59 |
| 2009/0150685 A1 | 6/2009 | Matsushima | |
| 2009/0183001 A1 | 7/2009 | Lu et al. | |
| 2009/0327725 A1 | 12/2009 | Park | |
| 2010/0250439 A1 | 9/2010 | Park et al. | |
| 2010/0268950 A1 | 10/2010 | Qu et al. | |
| 2011/0247075 A1* | 10/2011 | Mykland | G06F 21/10 726/26 |
| 2011/0277020 A1 | 11/2011 | Morita et al. | |
| 2012/0023590 A1 | 1/2012 | Rothschild et al. | |
| 2014/0208441 A1 | 7/2014 | Rantala | |

FOREIGN PATENT DOCUMENTS

| | | |
|---|---|---|
| JP | 2003-076553 | 3/2003 |
| JP | 2008-186386 | 8/2008 |
| WO | 2004/013744 | 2/2004 |
| WO | 2009/028606 | 3/2009 |

OTHER PUBLICATIONS

David Aucsmith et al., "Protect Software against Inverse Analysis and Tampering", Nikkei Electronics, Guest Paper 'Security', No. 706, Jan. 5, 1998, p. 209-220, with partial English translation.

Hiroyuki Ishima et al., "Tamper Resistant Technology for Software" ("Tamper-Resistant Technique for Software"), FujiXerox Technical Report, No. 13, Dec. 25, 2000, p. 20-28.

"ARM Security Technology Building a Secure System using TrustZone Technology", ARM Limited, Apr. 2009 (Revision C).

* cited by examiner

CONTENT REPRODUCTION SYSTEM, INFORMATION PROCESSING TERMINAL, MEDIA SERVER, SECURE DEVICE, AND SERVER SECURE DEVICE

TECHNICAL FIELD

The present invention relates to techniques for preventing analysis of digital content.

BACKGROUND ART

To protect digital content such as video and music (hereinafter, "content" refers to digital content) against unauthorized copy, various organizations have proposed their copyright protection standards. Such standards usually include robustness rules which are specifications indicating criteria for implementation. The robustness rules demand implementation of a copyright protection technology that can prevent unauthorized tampering or analysis by a malicious user.

The copyright protection technology according to the robustness rules is usually implemented by hardware or using a tamper-resistant technique constructed by the software described in Non Patent Literatures 1 and 2. The tamper-resistant technique makes reading difficult by performing compiling in the state where an unnecessary program code is inserted, for example. As another copyright protection technology, a technique of switching an execution mode of a Central Processing Unit (CPU) as shown in Non Patent Literature 3 is used in recent years. The implementation of such copyright protection standards is usually performed in the field of Personal Computers (PC).

CITATION LIST

Non Patent Literature

[NPL 1] "Protect Software against Inverse Analysis and Tampering," Nikkei Electronics 1998.1.5 (pp. 209-220)
[NPL 2] "Tamper-Resistant Technique for Software," Fuji Zerox Technical Report No. 13 (pp. 20-28)
[NFL 3] "ARM Security Technology Building a Secure System using TrustZone Technology"

SUMMARY OF INVENTION

Technical Problem

Improvement in security against the unauthorized tampering and analysis is also demanded not only in the PC field but also in the Non-PC field.

Accordingly, an object of the present invention is to provide a content reproduction system and the like that can improve the security against the unauthorized tampering and analysis.

Solution to Problem

In order to achieve the object above, one aspect of a secure device according to the present invention is a secure device which operates in cooperation with an information processing terminal which reproduces predetermined content, the secure device including: a second reception unit which receives a second program in a copyright protection application program from the information processing terminal, the copyright protection application program including a first program having a first execution format executable in the information processing terminal and the second program having a second execution format different from the first execution format and executable in the secure device, the second program being encrypted with a program key held by the secure device; a key storing unit which stores the program key; and a second application execution unit which decrypts the second program using the program key, and executes the decrypted second program, wherein the second application execution unit executes authentication between the second application execution unit and a media server using authentication information of the information processing terminal by executing the second program, the media server distributing the content.

Advantageous Effects of Invention

The content reproduction system and the like according to the present invention can improve the security against the unauthorized tampering and analysis.

DESCRIPTION OF EMBODIMENTS (Details of Problems)

Figure 1:
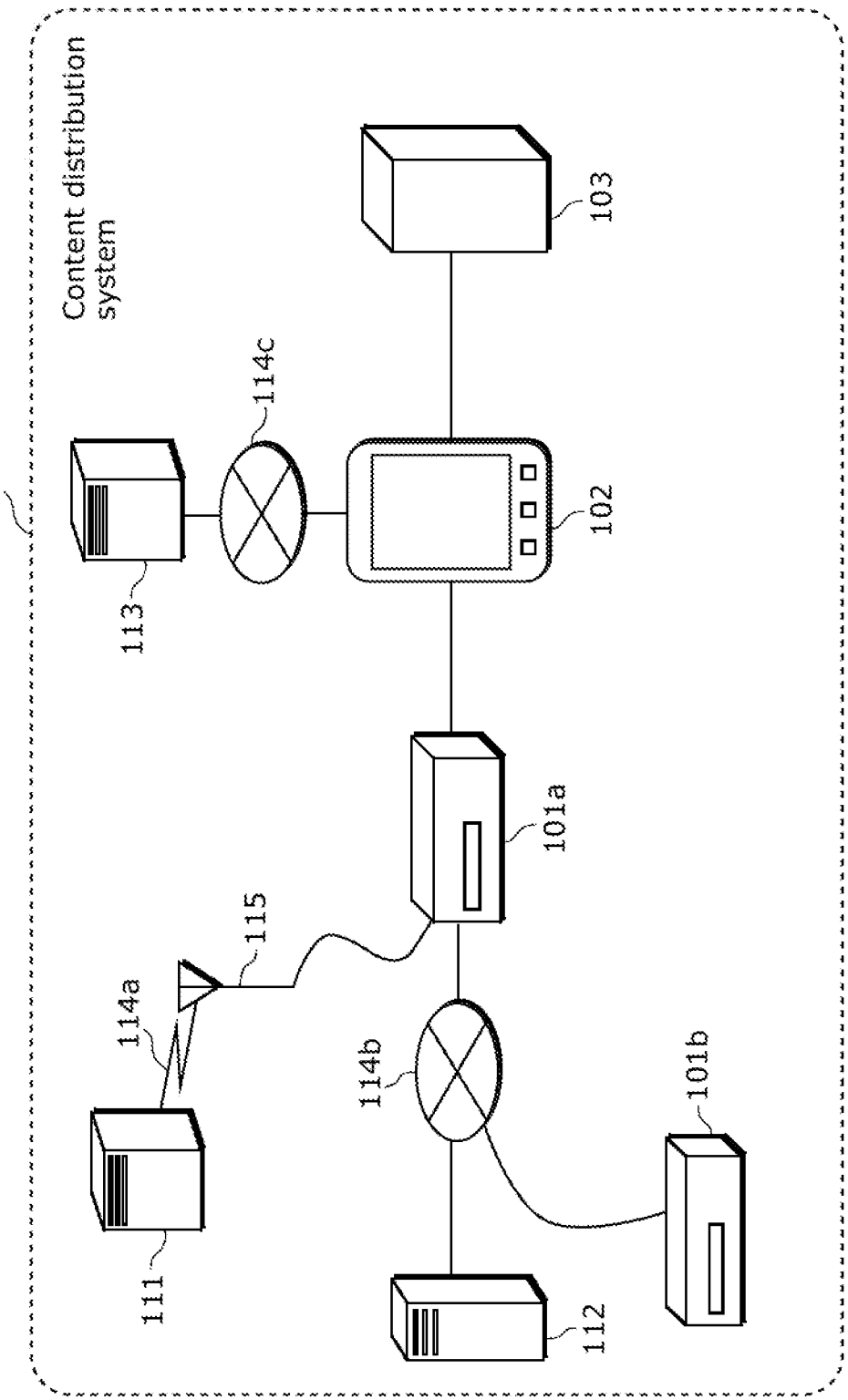
FIG. 1 is a block diagram showing a whole content distribution system according to Embodiment 1.

In the recent Non-PC field, mobile phones can increasingly use an app distribution system in which an application (hereinafter, referred to as an "app") is downloaded using AppStore for iPhone (registered trademark) provided by Apple Inc. or Android Market for Android (registered trademark) provided by Google Inc., for example, and used. Examples of the apps that can be downloaded using the app distribution include content reproduction apps for reproducing a variety of content (such as music content and moving picture content).

However, the security function at a level in which applications according to the copyright protection standards are executed is not applied to incorporated devices that support the app distribution widespread in recent years. Moreover, application of the conventional tamper-resistant technique using software is limited to the apps. For this reason, it is difficult to sufficiently provide resistance against the analysis by In Circuit Emulator (ICE: registered trademark) and other debuggers.

In order to solve such a problem, the content reproduction system according to one aspect of the present invention is a content reproduction system including: an application distribution server which distributes a copyright protection application program for reproducing predetermined content; an information processing terminal which reproduces the content by executing the copyright protection application program; and a secure device which operates in cooperation with the information processing terminal, wherein the application distribution server includes a storage unit which stores the copyright protection application program including a first program having a first execution format executable in the information processing terminal and a second program having a second execution format different from the first execution format and executable in the secure device, the second program being encrypted with a program key held by the secure device, the information processing terminal includes: a first reception unit which receives the copyright protection application program from the application distribution server; and a first application execution unit which extracts the second program from the copyright protection application program and transmits the second program to the secure device by extracting the first program from the copyright protection application program and executing the first program, the secure device includes: a key storing unit which stores the program key; a second reception unit which receives the second program from the information processing terminal; and a second application execution unit which decrypts the second program using the program key, and executes the decrypted second program, the second application execution unit executes authentication between the second application execution unit and a media server using authentication information of the information processing terminal by executing the second program, the media server distributing the content, and the first application execution unit reproduces the content by executing the first program when the authentication in the second application execution unit is completed successfully.

According to the thus-configured content reproduction system, in the copyright protection application program, the second program concerning the copyright protection has the second execution format executable in the secure device, and does not operate on the information processing terminal. Accordingly, the thus-configured content reproduction system can prevent the second program from being analyzed even if an analysis tool such as debuggers is connected to the information processing terminal, and operation of the information processing terminal is analyzed. Moreover, even if a person who performs unauthorized tampering extracts the second program, it is difficult to analyze the second program because the second program has an execution format different from that of the information processing terminal.

Further, according to the thus-configured content reproduction system, the first program includes the extraction and transmission of the second program. This eliminates change in the apparatus configuration of the information processing terminal. Thereby, according to the thus-configured content reproduction system, unauthorized copy or the like of the copyright protection application program can be prevented more efficiently in cooperation with the server and the secure device even in the information processing terminal which does not have sufficient security function for executing the copyright protection application program.

Moreover, for example, the content reproduction system further may include the media server, wherein the media server includes: a copyright protection processing unit which establishes a communication path enabling secure exchange of the content between the media server and the first program to be executed in the information processing terminal; a storage region which stores the content; and a data transmission and reception unit which transmits the content to the information processing terminal.

Moreover, for example, the copyright protection processing unit in the media server may have tamper resistance.

Moreover, for example, the media server may further include a unique information content adding unit which adds information unique to the media server to the content.

Moreover, for example, the secure device may include no connection unit that allows physical connection to an analysis tool that analyzes operation of the key storing unit and the second application execution unit.

Moreover, for example, the second program may have tamper resistance.

The secure device according to one aspect of the present invention is a secure device which operates in cooperation with an information processing terminal which reproduces predetermined content, the secure device including: a second reception unit which receives a second program in a copyright protection application program from the information processing terminal, the copyright protection application program including a first program having a first execution format executable in the information processing terminal and the second program having a second execution format different from the first execution format and executable in the secure device, the second program being encrypted with a program key held by the secure device; a key storing unit which stores the program key; and a second application execution unit which decrypts the second program using the program key, and executes the decrypted second program, wherein the second application execution unit executes authentication between the second application execution unit and a media server using authentication information of the information processing terminal by executing the second program, the media server distributing the content.

The server secure device according to one aspect of the present invention is a server secure device which communicates with an information processing terminal which reproduces predetermined content, the server secure device including: a media server which distributes the content to the information processing terminal; and a secure device which operates in cooperation with the information processing terminal, wherein the secure device includes: a second reception unit which receives a second program in a copyright protection application program from the information processing terminal, the copyright protection application program including a first program having a first execution format executable in the information processing terminal and the second program having a second execution format different from the first execution format and executable in the secure device, the second program being encrypted with a program key held in the secure device; a key storing unit which stores the program key; and a second application execution unit which decrypts the second program using the program key, and executes the decrypted second program, wherein the second application execution unit executes authentication between the second application execution unit and the media server using authentication information of the information processing terminal by executing the second program; and the media server includes: a copyright protection processing unit which establishes a communication path enabling secure exchange of the content between the media server and the first program to be executed in the information processing terminal; a storage region which stores the content; and a data transmission and reception unit which transmits the content to the information processing terminal.

The information processing terminal according to one aspect of the present invention is an information processing terminal which operates in cooperation with a secure device and reproduces predetermined content, the information processing terminal including: an application storing unit which stores a copyright protection application program including a first program having a first execution format executable in the information processing terminal and a second program having a second execution format different from the first execution format and executable in the secure device, the second program being encrypted with a program key held in the secure device; and a first application execution unit which extracts the second program in the copyright protection application program by extracting and executing the first program in the copyright protection application program, and transmits the second program to the secure device, wherein the first application execution unit further executes reproduction processing to reproduce the content by executing the first program when a media server which distributes the content is authenticated in the secure device.

The media server according to one aspect of the present invention is a media server which distributes content to an information processing terminal which reproduces predetermined content, the media server including: a copyright protection processing unit which executes authentication between the media server and a second program to be executed in the secure device, and establishes a communication path enabling secure exchange of content between the media server and a first program to be executed in the information processing terminal, wherein the first program and the second program are included in a copyright protection application program, the first program having a first execution format executable in the information processing terminal, and the second program having a second execution format different from the first execution format and executable in a secure device which operates in cooperation with the information processing terminal, the second program being encrypted with a program key held in the secure device; a storage region which stores the content; a unique information content adding unit which adds information unique to the media server to the content; and a data transmission and reception unit which encrypts the content to which the unique information is added, and transmits the encrypted content to the information processing terminal.

The secure device according to one aspect of the present invention is an integrated circuit for a secure device which operates in cooperation with an information processing terminal which reproduces predetermined content, the integrated circuit including: a second reception unit which receives a second program in a copyright protection application program from the information processing terminal, the copyright protection application program including a first program having a first execution format executable in the information processing terminal and the second program having a second execution format different from the first execution format and executable in the secure device, the second program being encrypted with a program key held in the secure device; and a second application execution unit which decrypts the second program using the program key stored in a key storing unit, and executes the decrypted second program, wherein the second application execution unit executes authentication between the second application execution unit and a media server using authentication information of the information processing terminal by executing the second program, the media server distributing the content.

The secure device control program according to one aspect of the present invention is a control program for a secure device which operates in cooperation with an information processing terminal, the control program including: receiving a second program in a copyright protection application program from the information processing terminal, the copyright protection application program including a first program having a first execution format executable in the information processing terminal and the second program having a second execution format different from the first execution format and executable in the secure device, the second program being encrypted with a program key held in the secure device; a decrypting the second program using the program key stored in a key storing unit in the secure device; and executing the second program in cooperation with the first program to be executed in the information processing terminal; wherein in the execution of the second program, by executing the second program, authentication is executed between the secure server and a media server using authentication information of the information processing terminal, the media server distributing the content.

The secure device control program is recorded on the recording medium on which the secure device control program according to one aspect of the present invention is recorded.

The integrated circuit in the server secure device according to one aspect of the present invention is an integrated circuit for a server secure device which communicates with an information processing terminal which reproduces predetermined content, the integrated circuit including: a media server which provides the content to the information processing terminal; and a secure device which operates in cooperation with the information processing terminal, wherein the secure device includes: a second reception unit which receives a second program in a copyright protection application program from the information processing terminal, the copyright protection application program including a first program having a first execution format executable in the information processing terminal and the second program having a second execution format different from the first execution format and executable in the secure device, the second program being encrypted with a program key held in the secure device; and a second application execution unit which decrypts the second program using the program key stored in a key storing unit, and executes the decrypted second program, wherein the second application execution unit executes authentication between the second application execution unit and the media server using authentication information of the information processing terminal by executing the second program; and the media server includes: a copyright protection processing unit which establishes a communication path enabling secure exchange of the content between the media server and the first program to be executed in the information processing terminal; and a data transmission and reception unit which transmits the content stored in a storage region to the information processing terminal.

The server secure device control program to one aspect of the present invention is a server secure device control program including a media server which provides predetermined content to an information processing terminal which reproduces the content, and a secure device which operates in cooperation with the information processing terminal, the server secure device control program including: establishing a communication path in the media server, the communication path enabling secure exchange of the content between the media server and a first program to be executed in the information processing terminal in a copyright protection application program including the first program having a first execution format executable in the information processing terminal and a second program having a second execution format different from the first execution format and executable in the secure device, the second program being encrypted with a program key held in the secure device; receiving the second program from the information processing terminal in the secure device; and decrypting the second program using the program key stored in a key storing unit, and executing the decrypted second program in the secure device, wherein in the execution of the second program, authentication is executed between the secure device and the media server using authentication information of the information processing terminal.

The server secure device control program is recorded on a recording medium on which the server secure device control program according to one aspect of the present invention is recorded.

The recording medium according to one aspect of the present invention on which the copyright protection application program is recorded is a recording medium on which a copyright protection application program to be executed in an information processing terminal which reproduces predetermined content and a secure device which operates in cooperation with the information processing terminal is recorded, wherein the copyright protection application program includes: a first program having a first execution format executable in the information processing terminal; and a second program having a second execution format different from the first execution format and executable in the secure device, the second program being encrypted with a program key held in the secure device, the second program includes causing the secure device to execute authentication between the second application execution unit and a media server using authentication information of the information processing terminal, the media server distributing the content, and the first program includes: causing the information processing terminal to extract the second program from the copyright protection application program and transmit the second program to the secure device; and causing the information processing terminal to reproduce the content when the authentication is completed successfully.

These whole or specific aspects may be implemented as a system, a method, an integrated circuit, a computer program, or a computer-readable recording medium such as a CD-ROM, or implemented as any combination of a system, a method, an integrated circuit, a computer program, or a recording medium.

Hereinafter, the content distribution system according to one aspect of the present invention will be specifically described with reference to the drawings.

The embodiments to be described below only show specific examples of the present invention. Numeral values, shapes, materials, components, arrangements, positions, and connection forms of the components, steps, order of the steps, and the like shown in the embodiments below are only examples, and will not limit the present invention. All the components described in the embodiments below are not always necessary to achieve the object above, but will be described as arbitrary components.

Embodiment 1

The configuration and operation of the content distribution system according to Embodiment 1 will be described with reference to FIG. 1 to FIG. 5.

[1. Configuration of Content Distribution System]

First, the configuration of the content distribution system will be described with reference to FIG. 1. FIG. 1 is a block diagram showing a content distribution system 100 according to the present embodiment.

The content distribution system 100 is a system including an app distribution system to distribute apps to an apparatus in the Non-PC field (information processing apparatus 102, corresponding to an information processing terminal).

As shown in FIG. 1, the content distribution system 100 according to the present embodiment includes media servers 101a and 1016, an information processing apparatus 102, a secure device 103, and an app distribution server 113 (app distribution server 113, the information processing apparatus 102 and the secure device 103 correspond to the content reproduction system). The content distribution system 100 according to the present embodiment is connected to a broadcast station server 111 and a Web server 112. The content distribution system 100 may have a configuration in which the content distribution system 100 is not connected to the broadcast station server 111 or the Web server 112, or is connected to other any server.

In the content distribution system 100 according to the present embodiment, the information processing apparatus 102 is configured to operate in cooperation with the secure device 103, and reproduce content stored in the media server 101a using an app distributed from the app distribution server 113.

The content includes music content, moving picture content, still picture content, book content, and map content.

In the present embodiment, the broadcast station server 111 is a server installed in a broadcast station that performs a terrestrial digital broadcasting (wireless broadcasting). The broadcast station server 111 transmits the content to the media server 101a via a broadcast wave 114a. The broadcast station server 111 may be a server installed in a broadcast station that performs wired broadcasting, or a server installed in a place other than the broadcast station.

In the present embodiment, the Web server 112 is a server which transmits the content via a network such as the Internet. The Web server 112 transmits the content to the media server 101a via the Internet 114b.

The media server 101a is a pocket server, for example. Although the details will be described later, the media server 101a receives the content from the broadcast station server 111, the Web server 112, or other media server 101b having the same function, and records the content. The media server 101b has the same configuration as that of the media server 101a in the present embodiment. In the configuration of the present embodiment, the content can be transmitted between the media server 101a and the media server 101b via the Internet 114b.

The app distribution server 113 is a server installed in an app distribution site that distributes an application for an iPhone or an Android, for example, and transmits an app executable in the information processing apparatus 102 to the information processing apparatus 102 via the Internet. The app includes a DL copyright protection app (corresponding to the copyright protection application program). The DL copyright protection app is an app for reproducing the content distributed from the broadcast station server 111 or the content distributed from the Web server 112.

Although the details will be described later, the information processing apparatus 102 receives the content from the media server 101a, and reproduces the content by executing the DL copyright protection app. At this time, the information processing apparatus 102 executes the processing in cooperation with the secure device 103 while the information processing apparatus 102 exchanges messages such as data and commands with the secure device 103.

Although the details will be described later, the secure device 103 operates in cooperation with the information processing apparatus 102 when in the execution of the app, the information processing apparatus 102 executes the processing concerning a concealed data algorithm concerning the copyright protection.

[1-1. Configuration of Media Server 101a]

Figure 2:
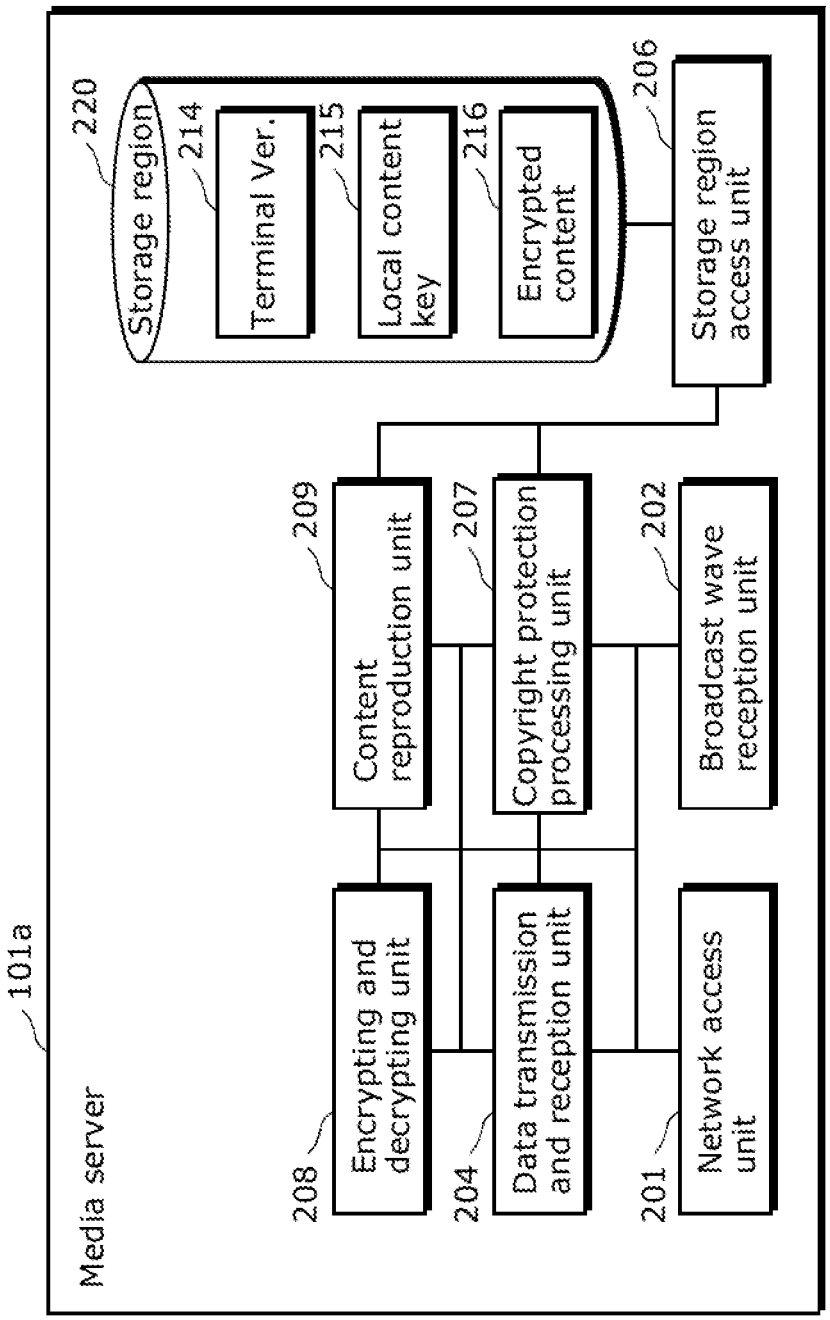
FIG. 2 is a block diagram showing a media server according to Embodiment 1.

Next, the configuration of media server 101a will be described with reference to FIG. 2. FIG. 2 is a drawing showing a whole configuration of the media server 101a according to the present embodiment.

The media server 101a is an electronic apparatus that obtains the content via the Internet 114b, the broadcast wave 114a, a local network (not shown), or the like, and manages the copyright of the content. The media server 101a is an apparatus including a communication unit and a storage unit such as an HDD recorder, a DVD/BD recorder, a set top box, a portable terminal, a tablet terminal, a mobile phone, a TV, or a game machine, for example.

As shown in FIG. 2, the media server 101a includes a network access unit 201, a broadcast wave reception unit 202, a data transmission and reception unit 204, a storage region access unit 206, a copyright protection processing unit 207, an encrypting and decrypting unit 208, a content reproduction unit 209, and a storage region 220. In the network access unit 201, the broadcast wave reception unit 202, the data transmission and reception unit 204, the storage region access unit 206, the copyright protection processing unit 207, the encrypting and decrypting unit 208, and the content reproduction unit 209, these may be separately, partially, or entirely formed with a dedicated LSI or the like, or formed with software.

The network access unit 201 executes the processing to connect the media server 101a to a server on the Internet 114b or other LAN (not shown). It is usually presumed that the connection processing uses IP protocols, but the method is not limited to this as long as the method is a method for communicating with other apparatus.

The broadcast wave reception unit 202 receives broadcast waves via an antenna 115 shown in FIG. 1.

The data transmission and reception unit 204 transmits and receives the data via the network access unit 201 or the broadcast wave reception unit 202. The data includes information whose exchange between terminals is specified in the copyright protection standards, the data and content received from the broadcast station server 111 or the Web server 112, and the content transmitted and received between the terminals.

As described above, the content includes the music content, the moving picture content, the still picture content, the book content, and the map content. The content is encoded by an encoding method usually determined. For example, in the case of the moving picture content, Motion Picture Expert Group 2 (MPEG2) can be thought. In the case of the still picture content, Joint Photographic Expert Gropup (JPEG) can be thought. Further, in the case of the music content, Advanced Audio Codec (AAC) can be thought. The method for encoding content is not limited to these. In reproduction of the content, the encoded content is decoded.

The storage region access unit 206 executes processing to read the data from the storage region 220, and controls processing to write the data to the storage region 220.

The copyright protection processing unit 207 executes algorithms specified in the copyright protection standards such as authentication between terminals using a terminal key which is specified in Digital Transmission Content Protection (DTCP) or the like, control of encryption and decryption of the content, and transmission and reception of the content. In part, the processing using encryption or a hash function is executed in the encrypting and decrypting unit 208 but not in the copyright protection processing unit 207.

Further, the copyright protection processing unit 207 holds a series of data needed for the processing specified in the copyright protection standards. The series of data includes a terminal key A1, a certificate Acert, a terminal ID, and a Root public key. The public key A1 included in the certificate Acert corresponds to the terminal key A1 which is a secret key.

Further, in the present embodiment, the copyright protection processing unit 207 holds the series of data needed for the processing specified in the copyright protection standards such as terminal key A1. Accordingly, the copyright protection technology according to the robustness rules is implemented, and resistance against analysis by a malicious user is provided. The copyright protection technology may be implemented by hardware or by the tamper-resistant technique as described in WO2004013744A2 (PTL), or the terminal itself may be implemented to have resistance, for example, the terminal cannot be connected to a debugger.

The encrypting and decrypting unit 208 executes the encryption and decryption concerning encryption by Advanced Encryption Standard (AES), Elliptic Curve Cryptography (ECC), Rivest Shamir Adleman (RSA) and the like, the processing of the hash function such as Secure Hash Algorithm 1 (SHA1), and random number generation. The processing executed in the encrypting and decrypting unit 208 may be the processing concerning the encryption and the hash function, and is not limited to the encryption and decryption, hash function processing, and random number generation.

When ECC concealed parameters are specified in the copyright protection standards such as DTCP, the copyright protection technology according to the robustness rules is implemented, and resistance against analysis by a malicious user is provided in not only the copyright protection processing unit 207 holding the terminal key A1 but also the encrypting and decrypting unit 208. Similarly to the case of the copyright protection processing unit 207, the copyright protection technology may be implemented by hardware or by the tamper-resistant technique as described in WO2004013744A2 (PTL), or the terminal itself may be implemented to have resistance, for example, the terminal cannot be connected to a debugger.

The content reproduction unit 209 executes the reproduction processing to reproduce an encrypted content 216 stored in the storage region 220. Specifically, the content reproduction unit 209 obtains the encrypted content 216 and the local content key 215 stored in the storage region 220 via the storage region access unit 206. Further, the content reproduction unit 209 transmits the obtained encrypted content 216 and local content key 215 to the encrypting and decrypting unit 208, obtains the decrypted encrypted content 216 from the encrypting and decrypting unit 208, and reproduces the decrypted content.

The storage region 220 is a storage region that stores the data used in the processing by a variety of function units in the media server 101a, and is implemented by a non-volatile memory that can hold the stored content even if the power supply is turned off, such as a Hard disk drive (HOD), a Flash Read Only Memory (Flash ROM), and a Solid State Drive (SSD). The storage region 220 may be implemented by a volatile memory such as a Static Random Access Memory (SRAM), and the data may be held by battery backup using a battery as the power supply.

The storage region 220 holds a terminal Ver. 214 indicating the Version No. of the media server 101a, the encrypted content 216, and the local content key 215 for decrypting the encrypted content 216. The local content key 215 is a key used locally only in the internal processing in the media server 101a. The encrypted content 216 encrypted with the local content key cannot be reproduced by other terminal.

The media server 101a further includes an input and output unit and the like not shown in FIG. 2. These are not essential to the present invention, and the description will be omitted. The media server 101a also includes components usually necessary for the computer such as a CPU, a Random Access Memory (RAM), and an Operating System (OS). These are not essential to the present invention, and the description will be omitted.

[1-2. Configuration of Information Processing Apparatus 102]

Figure 3:
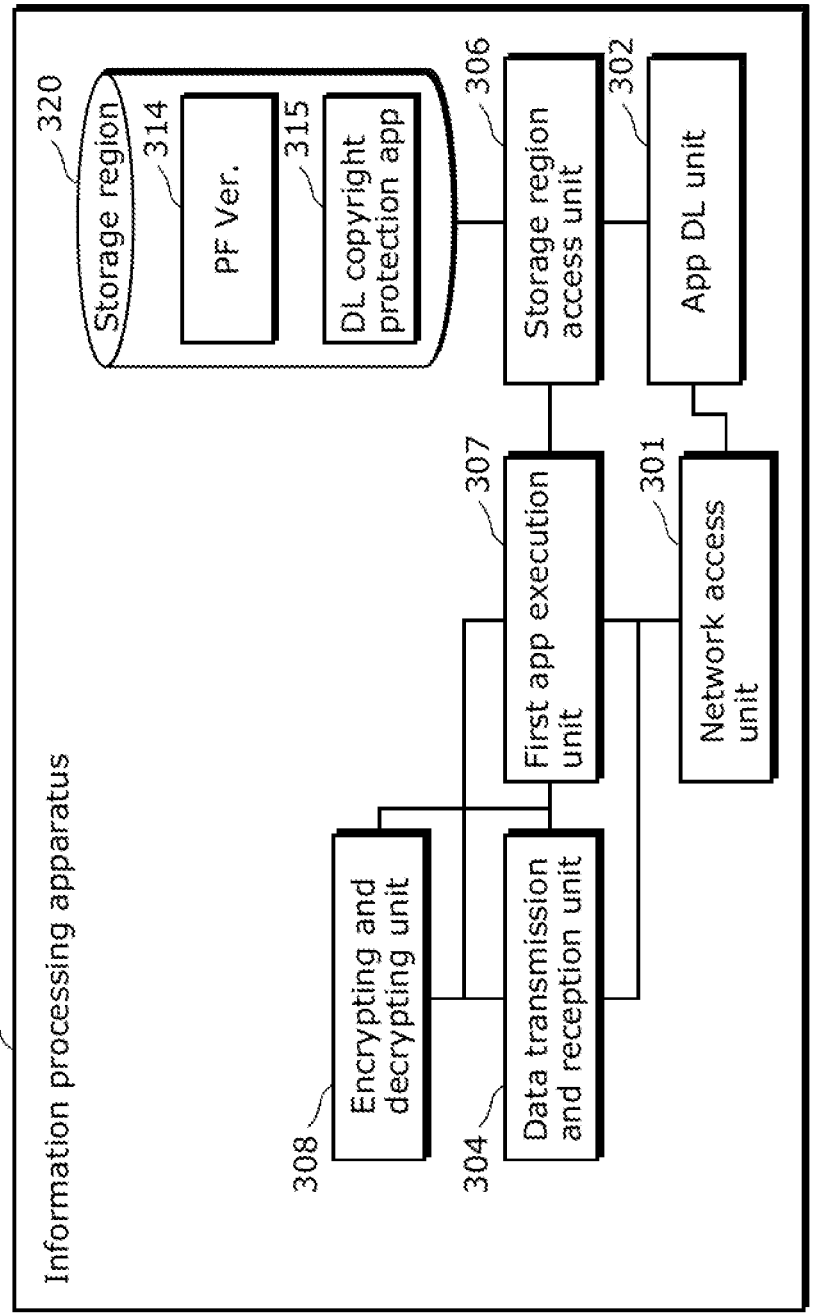
FIG. 3 is a block diagram showing an information processing apparatus according to Embodiment 1.

Next, the configuration of the information processing apparatus 102 will be described with reference to FIG. 3. FIG. 3 is a drawing showing a whole configuration of the information processing apparatus 102 according to the present embodiment.

In the present embodiment, the information processing apparatus 102 is a mobile phone ready for the app distribution. By executing the app downloaded from the app distribution server 113, the information processing apparatus 102 operates in cooperation with the secure device 103, and reproduces the content stored in the media server 101a. The information processing apparatus 102 is not limited to the mobile phone, and may be an apparatus including a communication unit and a storage region such as a portable terminal, a tablet terminal, an HDD recorder, a DVD/BD recorder, a set top box, a TV, and a game machine.

As shown in FIG. 3, the information processing apparatus 102 includes a network access unit 301, an app DL unit 302, a data transmission and reception unit 304, a storage region access unit 306, a first app execution unit 307, an encrypting and decrypting unit 308, and a storage region 320.

The network access unit 301 executes the processing to connect the information processing apparatus 102 to a server on the Internet 114b or an apparatus on other LAN (not shown). It is usually presumed that the connection processing uses IP protocols, but the method is not limited to this as long as the method is a method for communicating with other apparatus.

Prior to reproduction of the content, the app DL unit 302 (and the data transmission and reception unit 304 correspond to the first reception unit) downloads a DL copyright protection app 315 via the network access unit 301 from the app distribution server 113. The DL copyright protection app 315 is partially encrypted with a DL app key 515 held by the secure device 103, although the details will be described later.

The data transmission and reception unit 304 transmits and receives the data via the network access unit 301. The data transmitted and received by the data transmission and reception unit 304 includes the data whose exchange between terminals is specified in the copyright protection standards, such as random numbers and the certificate, the data transmitted to and received from the media server 101a, and the data and content transmitted to and received from the secure device 103.

The storage region access unit 306 executes the processing to read the data from the storage region 320, and controls the processing to write the data in the storage region 320.

The first app execution unit 307 executes the DL copyright protection app 315 stored in the storage region 320. In cooperation with the secure device 103, the first app execution unit 307 executes the algorithms specified in the copyright protection standards such as the authentication between the terminals using a terminal key which is specified in DTCP and included in the DL copyright protection app 315, and control of encryption and decryption of the content. In part, the processing using the encryption or the hash function is executed in the encrypting and decrypting unit 308 but not in the first app execution unit 307.

The encrypting and decrypting unit 308 executes the encryption and decryption concerning encryption such as AES, ECC, and RSA, the processing of the hash function such as SHA1, and the random number generation. The processing executed in the encrypting and decrypting unit 308 may be the processing concerning the encryption and the hash function, and are not limited the encryption and decryption, hash function processing, and random number generation above.

The storage region 320 (corresponding to the app storing unit) is a storage region that stores the data used in the processing in a variety of function units of the information processing apparatus 102. The storage region 320 is implemented by a non-volatile memory that can hold the stored content even if the power supply is turned off, such as an HDD, a Flash ROM, and an SSD. The storage region 320 may be implemented by a volatile memory such as an SRAM, and the data may be held by battery backup using a battery as the power supply. Alternatively, the storage region 320 may be implemented by a combination of a non-volatile memory and a volatile memory. The storage region 320 stores PF Ver.314 indicating the platform No. such as the kind and the version No. of an OS for the information processing apparatus 102, and the DL copyright protection app 315 downloaded by the app DL unit 302.

The information processing apparatus 102 further includes an input and output unit and the like not shown in FIG. 3. These are not essential to the present invention, and the description will be omitted. The information processing apparatus 102 also includes components usually necessary for a computer such as a CPU, a RAM, and an OS. These are not essential to the present invention, and the description will be omitted.

[1-3. Configuration of DL Copyright Protection App 315]

Figure 4:
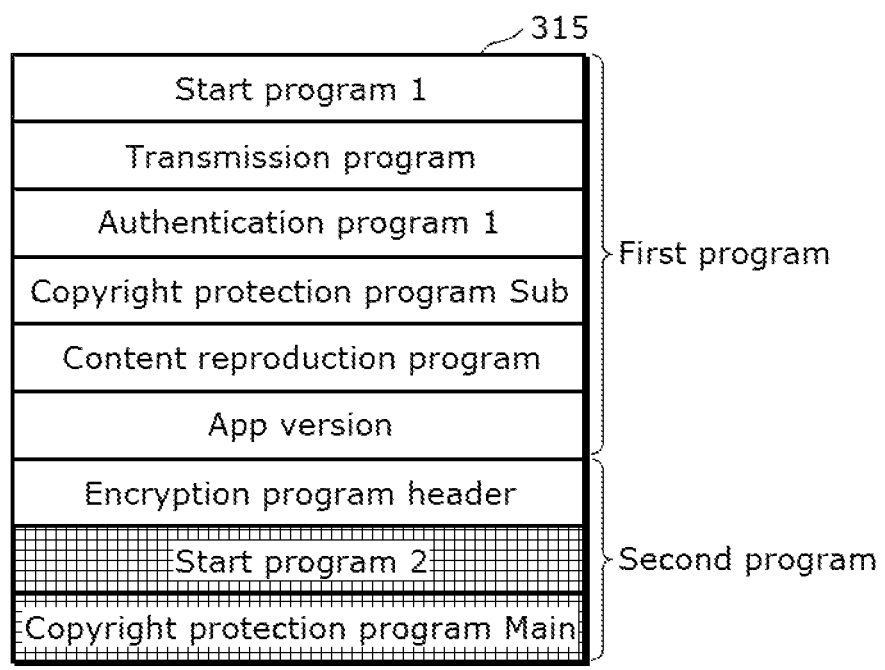
FIG. 4 is a block diagram showing a DL copyright protection app according to Embodiment 1.

The configuration of DL copyright protection app 315 will be described with reference to FIG. 4. FIG. 4 is a drawing showing the configuration of the DL copyright protection app 315 according to the present embodiment.

The DL copyright protection app 315 is composed of a first program compiled into a first execution format executable in the information processing apparatus 102 and a second program compiled into a second execution format executable in the secure device 103. The second execution format is different from the first execution format. Further, in the present embodiment, the second execution format is an execution format that cannot be executed in the information processing apparatus 102.

The first program is an ordinary execution program in the information processing apparatus 102, and includes a start program 1, a transmission program, an authentication program 1, a copyright protection program Sub, a content reproduction program, an app version, and an encryption program header. The first program is executed by the first app execution unit 307 unless otherwise specified.

The start program 1 is a program executed first when the first app execution unit 307 executes the DL copyright protection app 315.

The transmission program is a program that extracts the second program in the DL copyright protection app 315, and transmits the extracted second program to the secure device 103.

The authentication program 1 has an authentication key valid between an authentication unit 504 in the secure device 103 and the information processing apparatus 102. The authentication program 1 executes the authentication between the authentication program 1 and the authentication unit 504 in the secure device 103 using the authentication key, and generates a secure communication key valid only during the connected session. In the present embodiment, the authentication has been described as one example using the case where challenge and response authentication is bidirectionally executed to perform mutual authentication, but the authentication is not limited to this method as long as the authentication can be performed between the terminals. The authentication program 1 is executed by the first app execution unit 307 while part of the authentication program 1 such as the processing using the encryption or the hash function is executed by the encrypting and decrypting unit 308.

In the present embodiment, the secure communication key is a key valid only during the session in which the information processing apparatus 102 is connected to the secure device 103, but not limited to this. The secure communication key may be an individual key individually generated for each secure device 103 based on the information unique to the information processing apparatus 102, for example. As the information unique to the information processing apparatus 102 (mobile phone), a telephone number, a Globally Unique Identifier (GUID), a Universally Unique Identifier (UUID), a mail address, a MAC address, an International Mobile Equipment Identity (IMEI), or composite information thereof can be thought, for example.

The copyright protection program Sub is a program executed after the authentication program 1 is executed, and a secure communication is established between the secure device 103 and the information processing apparatus 102. Specifically, implementation of the copyright protection program Sub allows the information processing apparatus 102, in cooperation with the secure device 103, to execute the algorithms specified in the copyright protection standards, such as the authentication between the terminals specified in the DTCP or the like (between the media server 101a and the information processing apparatus 102 here) using the terminal key and control of the encryption and decryption of the content. The authentication and control of the encryption and decryption of the content described above are executed by a copyright protection program Main executed in the secure device 103 while the copyright protection program Sub executes transmission and reception of the data (such as a variety of keys and certificates, and random numbers) between the media server 101a and the secure device 103. In part, the processing using an encryption algorithm may be executed by the encrypting and decrypting unit 308.

The content reproduction program reproduces the content received from the media server 101a. Based on the method specified in the DTCP or the like, the reproduction is performed using the content key generated after the copyright protection program Main is executed.

The app version indicates the version information of the DL copyright protection app 315.

The second program is a program executed on the secure device 103, and includes an encryption program header, a start program 2, and the copyright protection program Main. The second program is partially encrypted with a DL app key 515 held by the secure device 103. Although the details will be described later, when the secure device 103 receives the second program, the secure device 103 decrypts the second program using the DL app key 515.

The encryption program header is a region in which the header information of the second program is written. In the second program, only the encryption program header is not encrypted.

The start program 2 is a program which is executed first after decryption of the DL app key 515. The start program 2 executes initialization and the like.

The copyright protection program Main is a program for causing the secure device 103, instead of the information processing apparatus 102, to execute the processing concerning the algorithms specified in the copyright protection standards, which are executed by the conventional information processing apparatus. The copyright protection program Main is executed after the DL app key 515 is decrypted and initialization is executed by the start program 2. As described above, the copyright protection program Main causes the secure device 103, instead of the information processing apparatus 102, to execute the authentication between the terminals specified in the DTCP or the like using the terminal key, the content key generation, and the like. In part, the processing using the encryption or the hash function is executed by the encrypting and decrypting unit 508 in the secure device 103 described later. The second program includes a series of data necessary for the processing, a terminal key B1, a certificate Bcert, a terminal ID, and a Root public key. The public key B1 included in the certificate Bcert corresponds to the terminal key B1 which is a secret key.

The second program may be not only compiled into the execution format executable in the secure device 103, but also have tamper resistance to operate on a secure execution function supported by the secure device 103.

Moreover, the first program and the second program may be configured as one application, and is provided as the same file, but not limited to this. The DL copyright protection app 315 may be composed of a plurality of files when a Dynamic Link Library (DLL) file) is used, for example.

Moreover, in the secure device 103, the decoding using the start program 2 and the DL device key in the copyright protection program Main may be executed in batch, or may be executed for individual programs. Further, another configuration may be used in which the respective programs are further divided, and the decoding is executed for divided individual programs.

[1-4. Configuration of Secure Device 103]

Figure 5:
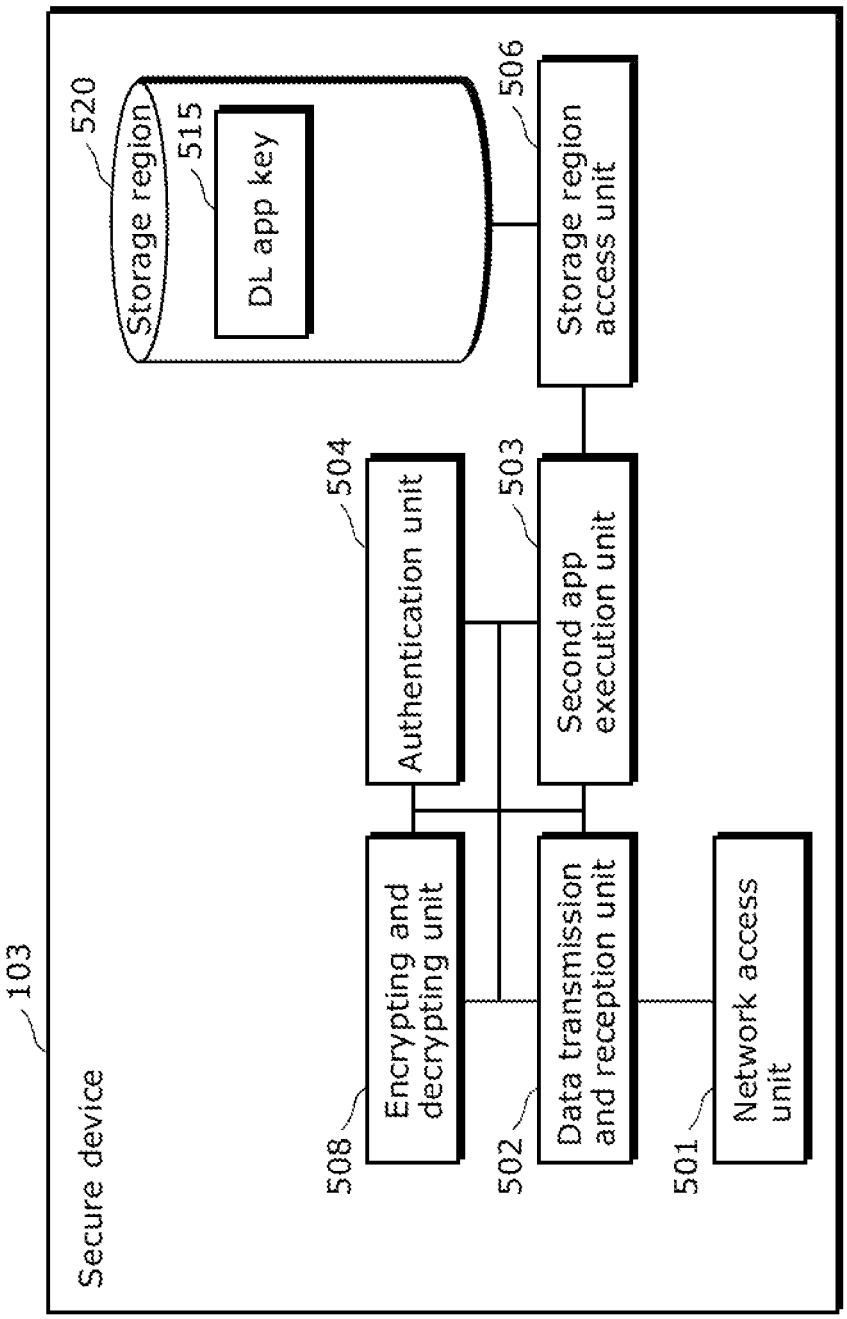
FIG. 5 is a block diagram showing a secure device according to Embodiment 1.

Next, the configuration of secure device 103 will be described with reference to FIG. 5. FIG. 5 is a drawing showing a whole configuration of the secure device 103 according to the present embodiment.

The secure device 103 operates in cooperation with the information processing apparatus 102 when the information processing apparatus 102 obtains and reproduces the content stored in the media server 101a. The secure device 103 includes a communication unit and a storage unit, and can be connected to the information processing apparatus 102. The secure device 103 may be a dedicated apparatus, or an apparatus such as a portable terminal, a tablet terminal, a mobile phone, an HDD recorder, a DVD/BD recorder, a set top box, a TV, and a game machine.

The secure device 103 according to the present embodiment is implemented to have resistance against analysis from the outside, for example, the terminal itself cannot be connected to a debugger. The secure device 103 is configured not to include a connection circuit to the debugger (JTAG debugger) such as a test terminal for a test circuit for JTAG or the like, which is implemented in an ordinary product. Thus, the secure device 103 has no configuration to connect to a physical analysis tool. This enhances the resistance of the secure device 103 against unauthorized analysis by the physical analysis tool.

The secure device 103 includes a network access unit 501, a data transmission and reception unit 502, a second app execution unit 503, an authentication unit 504, a storage region access unit 506, an encrypting and decrypting unit 508, and a storage region 520.

The network access unit 501 executes the processing to connect the information processing apparatus 102 to a server on the Internet 114b or an apparatus on other LAN (not shown). It is usually presumed that the connection processing uses IP protocols, but the method is not limited to this as long as the method is a method for communicating with other apparatus.

The data transmission and reception unit 502 (corresponding to the second reception unit) transmits and receives the data via the network access unit 501. The transmitted and received data includes the information whose exchange between the terminals is specified in the copyright protection standards, and the data transmitted to and received from the information processing apparatus 102. The data transmission and reception unit 502 receives the second program from the information processing apparatus 102.

The storage region access unit 506 executes the processing to read the data from the storage region 520, and control the processing to write the data in the storage region 520.

Using the DL app key 515 in the storage region 520, the second app execution unit 503 decrypts the second program in the DL copyright protection app 315 received via the network access unit 501 and the data transmission and reception unit 502, and executes the decrypted second program.

By executing the second program, the second app execution unit 503 executes the algorithms specified in the copyright protection standards such as the authentication between the terminals specified in the copyright protection standards such as DTCP using the terminal key, which is performed between the media server 101a and the secure device 103, and control of the encryption and decryption processing, of the content. In part, the processing using the encryption or the hash function is executed by the encrypting and decrypting unit 508.

The authentication unit 504 has an authentication key. The authentication unit 504 executes the authentication between the authentication unit 504 and the authentication program 1 executed in the information processing apparatus 102, and generates a secure communication key valid only during the connected session. In the present embodiment, as described above, the authentication has been described as one example using the case where challenge and response authentication is bidirectionally executed to perform mutual authentication, but the authentication is not limited to this method as long as the authentication can be performed between the terminals. In part, the processing using the encryption or the hash function is executed using the encrypting and decrypting unit 508. The secure communication key is the key valid only during the session in which the information processing apparatus 102 is connected to the secure device 103, but not limited to this. The secure communication key may be an individual key, for example.

The encrypting and decrypting unit 508 executes the encryption and decryption concerning encryption such as AES, ECC, and RSA, the processing of the hash function such as SHA1, and the random number generation. The processing executed in the encrypting and decrypting unit 508 may be the processing concerning the encryption and the hash function, and are not limited the encryption and decryption, hash function processing, and random number generation above.

The storage region 520 (corresponding to the key storing unit) is a storage region that stores the DL app key (corresponding to the program key) 515. The storage region 520 is implemented by a non-volatile memory that can hold the stored content even if the power supply is turned off, such as an HDD, a Flash ROM, and an SSD. The storage region 520 may be implemented by a volatile memory such as an SRAM, and the data may be held by battery backup using a battery as the power supply.

The secure device 103 is implemented to have resistance against analysis from the outside, for example, the terminal itself cannot be connected to a debugger. This prevents the analysis when the second app execution unit 503 or the encrypting and decrypting unit 508 is being executed. Additionally, the DL app key 515 is protected by a secure storage region in which the storage region 520 itself is implemented to have access limitation, or protected by encryption.

The secure device 103 itself is implemented to have resistance. Alternatively, the second program in the DL copyright protection app 315 may have tamper resistance, and a function to assist secure execution of the second program may be installed in the secure hardware that the second app execution unit 503 or the secure device 103 has.

[2. Operation of Content Distribution System]

Next, operation of the content distribution system will be described with reference to FIG. 6 to FIG. 9. FIG. 6 to FIG. 9 are drawings showing the processing procedure when the information processing apparatus 102 reproduces the content in the media server 101a in cooperation with the secure device 103.

Figure 6:
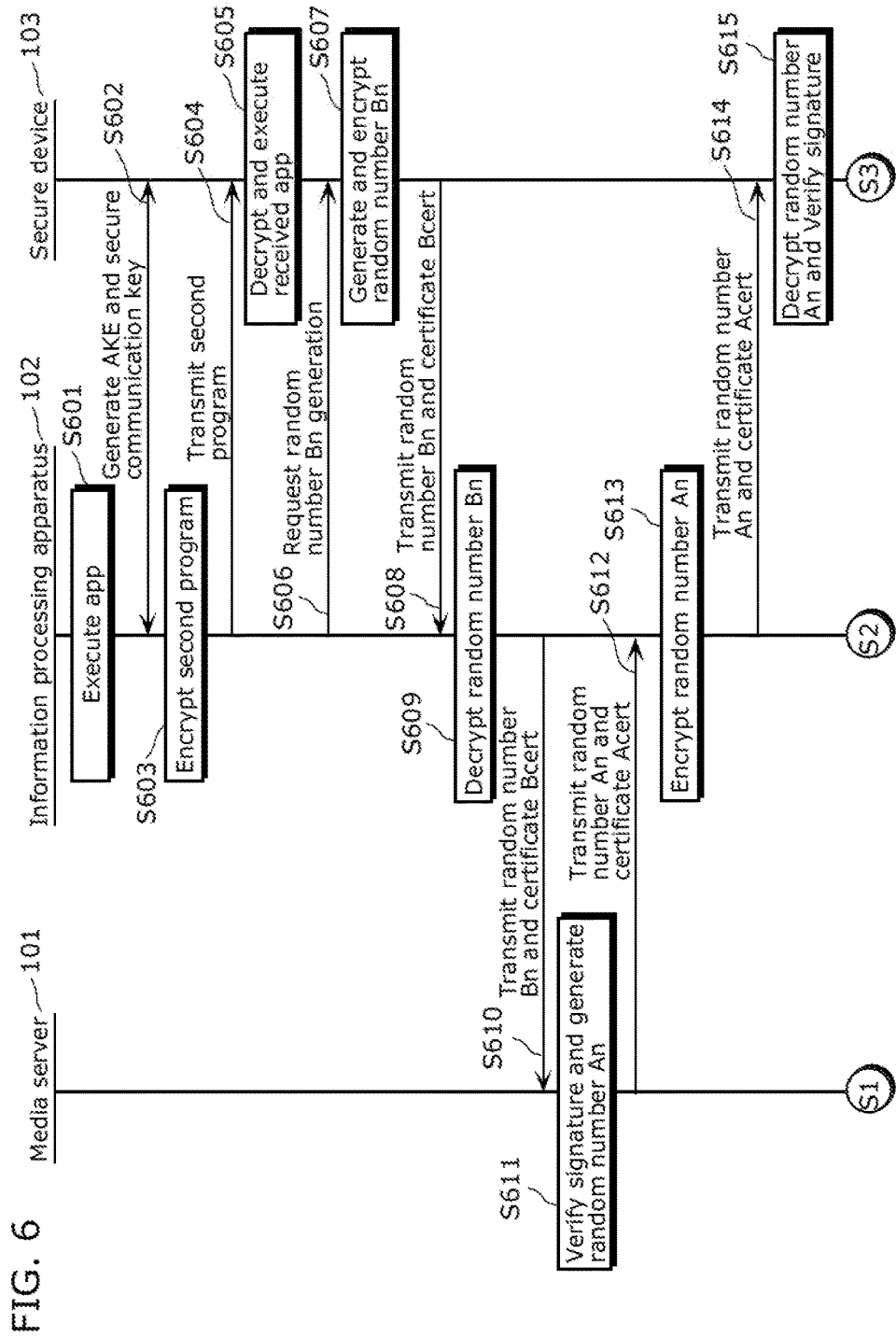
FIG. 6 is a flowchart (1) showing a processing procedure of reproducing content in Embodiment 1.

As shown in FIG. 6, according to an instruction by a user, execution of the DL copyright protection app 315 is instructed in the information processing apparatus 102 (Step S601). Then, the first app execution unit 307 calls the DL copyright protection app 315 via the storage region access unit 306. Further, the first app execution unit 307 executes the start program 1 of the first program in the called DL copyright protection app 315.

The information processing apparatus 102 mutually executes the authentication between the secure device 103 and the information processing apparatus 102. When the authentication is completed successfully, a secure communication path is established (Step S602).

Specifically, when the authentication program 1 in the DL copyright protection app 315 is executed, the first app execution unit 307 in the information processing apparatus 102 executes the authentication between the authentication unit 504 in the secure device 103 and the first app execution unit 307. In the authentication, the first app execution unit 307 transmits the PF Ver.314 to the secure device 103.

In the authentication, the secure device 103 verifies the information included in the PF Ver.314 transmitted from the information processing apparatus 102 such as the kind and version No. of the OS. When the kind or version No. of the OS has no match, communication is no longer performed, and is terminated. Further, the secure device 103 verifies the app version of the DL copyright protection app 315 transmitted from the information processing apparatus 102. When the app version has no match, communication is no longer performed, and is terminated.

When both the information processing apparatus 102 and the secure device 103 are authenticated, a secure communication key valid only during the connected session is generated both in the information processing apparatus 102 and in the secure device 103.

Next, in the information processing apparatus 102, the encrypting and decrypting unit 308 encrypts the second program in the DL copyright protection app 315 using the secure communication key generated in the authentication (Step S603).

The first app execution unit 307 in the information processing apparatus 102 transmits the encrypted second program via the data transmission and reception unit 304 to the secure device 103 (Step S604).

The secure device 103 receives the encrypted second program in the DL copyright protection app 315 via the data transmission and reception unit 502. Further, the second app execution unit 503 in the secure device 103 decrypts the second program received via the data transmission and reception unit 502, and executes the second program (Step S605). Specifically, in the secure device 103, the encrypting and decrypting unit 508 decrypts the second program using the secure communication key. Further, the second app execution unit 503 decrypts the start program 2 and the copyright protection program Main in the second program using the DL app key 515, and executes the start program 2 and the copyright protection program Main.

The information processing apparatus 102 transmits a random number Bn generation request to the secure device 103 (Step S606).

When the secure device 103 receives the random number Bn generation request, the encrypting and decrypting unit 508 generates a random number Bn (Step S607). Further, the secure device 103 executes encryption using the generated random number Bn and certificate Bcert together with the secure communication key.

The secure device 103 transmits the encrypted random number Bn and certificate Bcert to the information processing apparatus 102 (Step S608).

The information processing apparatus 102 receives the encrypted random number Bn and certificate Bcert from the secure device 103 via the data transmission and reception unit 304. Then, in the information processing apparatus 102, the encrypting and decrypting unit 308 decrypts the random number Bn using the secure communication key (Step S609).

The information processing apparatus 102 transmits the decrypted random number Bn and the certificate Bcert encrypted in the secure device 103 with the secure communication key to the media server 101a via the data transmission and reception unit 304 (Step S610).

The media server 101a receives the random number Bn and the certificate Bcert via the data transmission and reception unit 204. Then, in the media server 101a, using a Root public key, the encrypting and decrypting unit 208 verifies the certificate Bcert (part of Step S611, Verify signature). When the result of verification is NG, the media server 101a returns an error, and terminates the processing. When the result of verification is OK, the media server 101a generates a random number An (part of Step S611, Generate random number An).

The media server 101a transmits the random number An and the certificate Acert via the data transmission and reception unit 204 to the information processing apparatus 102 (Step S612).

The information processing apparatus 102 receives the random number An and the certificate Acert via the data transmission and reception unit 304. Then, in the information processing apparatus 102, the encrypting and decrypting unit 308 encrypts the random number An and the certificate Acert using the secure communication key (Step S613).

The information processing apparatus 102 transmits the encrypted random number An and certificate Acert via the data transmission and reception unit 304 to the secure device 103 (Step S614).

The secure device 103 receives the random number An and the certificate Acert via the data transmission and reception unit 502. Then, in the secure device 103, the encrypting and decrypting unit 508 decrypts the random number An and the certificate Acert using the secure communication key (part of Step S615, Decrypt random number An). Further, in the secure device 103, the encrypting and decrypting unit 508 verifies the certificate Acert using the Root public key (part of Step S615, Verify signature). When the result of verification in Step S615 is NG, the secure device 103 returns an error, and terminates the processing.

Figure 7:
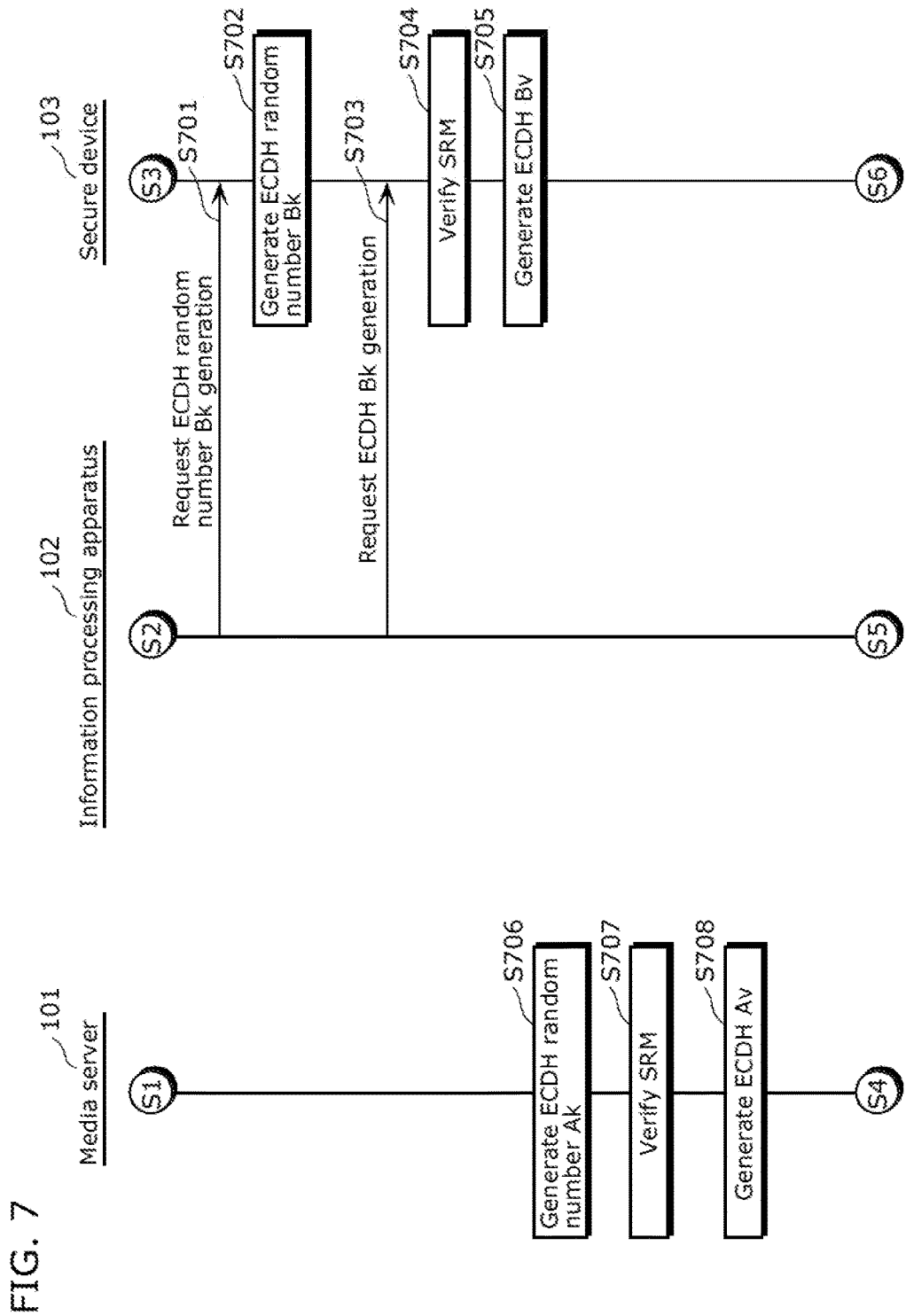
FIG. 7 is a flowchart (2) showing the processing procedure of reproducing content in Embodiment 1.

As shown in FIG. 7, after the information processing apparatus 102 transmits the random number An and the certificate Acert to the secure device 103, when the result of verification by the secure device 103 in Step S615 is OK (when no error is returned), the information processing apparatus 102 transmits a first random number Bk generation request in an Elliptic Curve Dirrie-Hellman (ECDH) key sharing method to the secure device 103 (Step S701).

When the secure device 103 receives the ECDH random number Bk generation request via the data transmission and reception unit 502, the encrypting and decrypting unit 508 generates a random number Bk (Step S702).

The information processing apparatus 102 transmits an ECDH Bv generation request to the secure device 103 (Step S703).

The secure device 103 receives the ECDH By generation request via the data transmission and reception unit 502. Then, the secure device 103 verifies whether a System Renewability Message (SRM) has the certificate Acert (Step S704). When the result of verification in Step S704 is NG, the secure device 103 returns an error, and terminates the processing.

When the result of verification in Step S704 is OK, using the random number Bk, the secure device 103 generates By which is a first phase value in the ECDH key sharing method. By is determined by calculating a Bk multiplied value of a base point in an elliptic curve.

After the media server 101a transmits the random number An and the certificate Acert in S612, the encrypting and decrypting unit 208 generates a random number Ak (Step S706).

The media server 101a verifies whether the SRM has the certificate Bert (Step S707). When the result of verification in Step S707 is NG, the media server 101a returns an error, and terminates the processing.

When the result of verification in Step S707 is OK, the media server 101a generates Av as the first phase value (Step S708).

Figure 8:
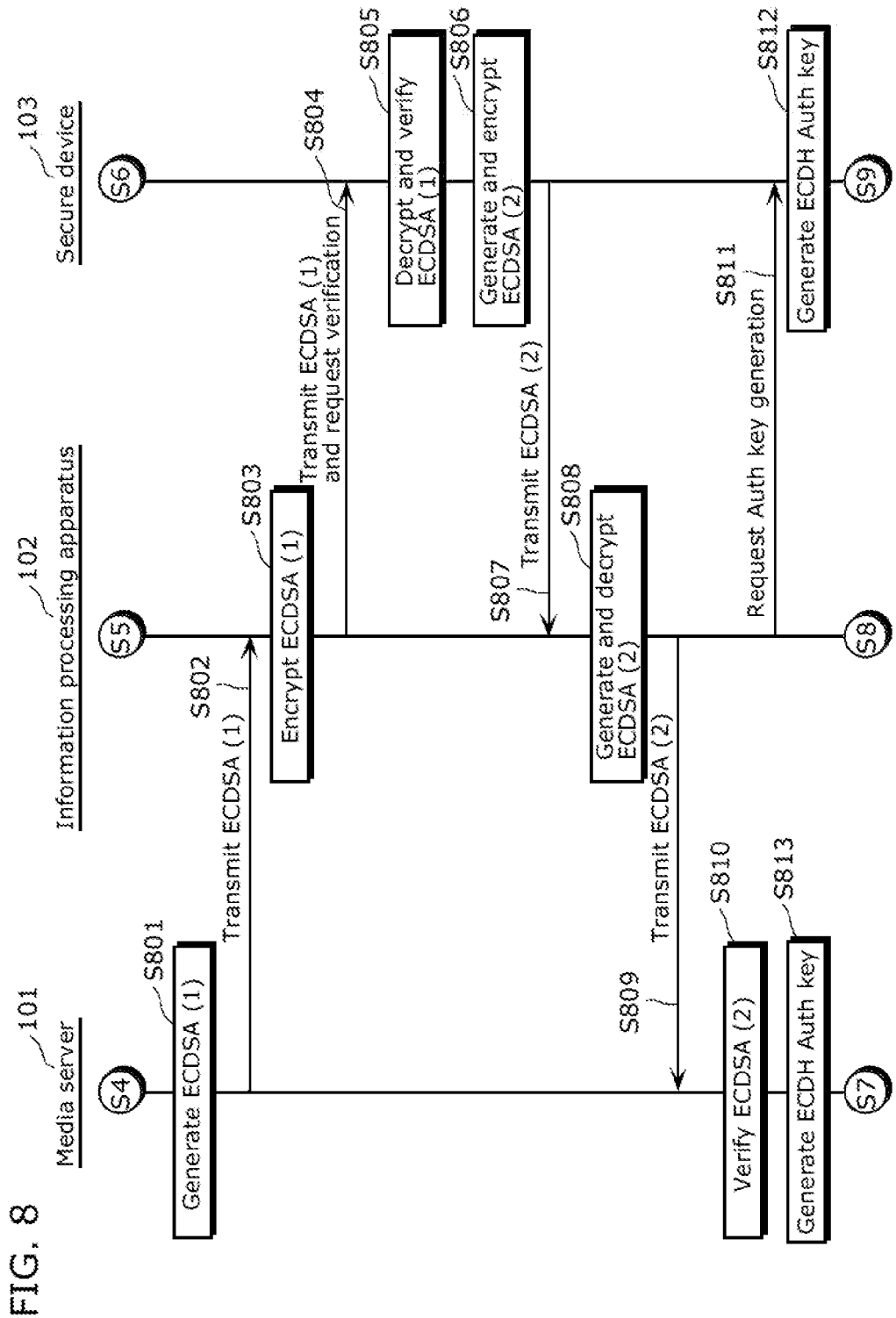
FIG. 8 is a flowchart (3) showing the processing procedure of reproducing content in Embodiment 1.
Figure 9:
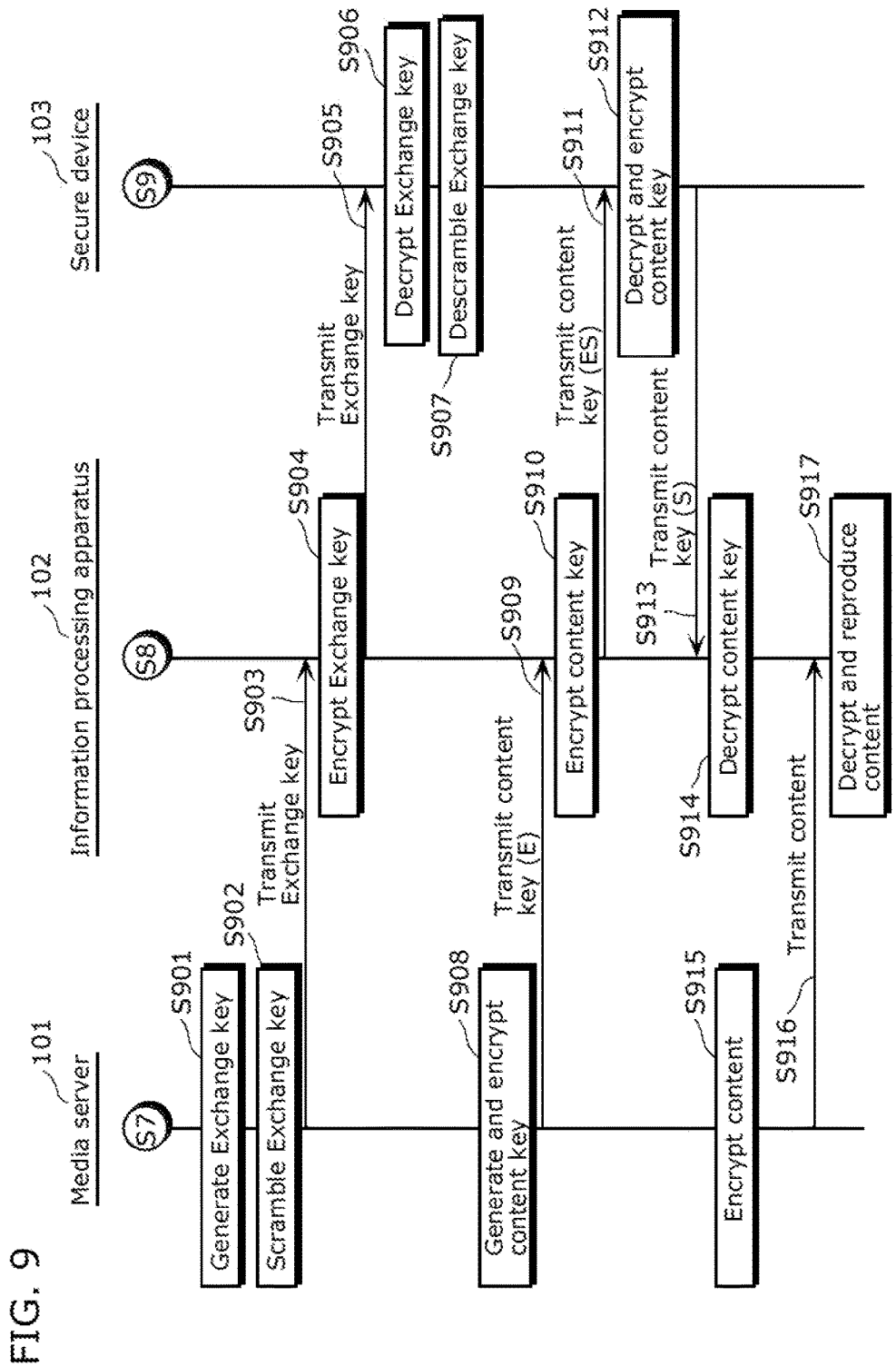
FIG. 9 is a flowchart (4) showing the processing procedure of reproducing content in Embodiment 1.

Next, as shown in FIG. 8, using the random number Bn, the first phase value Av, the SRM, and the terminal key A1 in the media server 101a, the media server 101a generates an ECDSA (1) using an Elliptic curve digital signature algorithm (ECDSA) method (Step S801).

The media server 101a transmits the ECDSA (1) via the data transmission and reception unit 204 to the information processing apparatus 102 (Step S802).

The information processing apparatus 102 receives the ECDSA (1) via the data transmission and reception unit 304. Then, the encrypting and decrypting unit 308 encrypts the ECDSA (1) using the secure communication key (Step S803).

The information processing apparatus 102 transmits the encrypted ECDSA (1) and an ECDSA (1) verification request via the data transmission and reception unit 304 to the secure device 103 (Step S804).

The secure device 103 receives the ECDSA (1) and the verification request via the data transmission and reception unit 502. In the secure device 103, the encrypting and decrypting unit 508 decrypts the ECDSA (1) using the secure communication key. Further, the secure device 103 verifies the ECDSA (1) using a public key A1 in the certificate Acert (Step S805). When the result of verification in Step S805 is NG, the secure device 103 returns an error, and terminates the processing.

When the result of verification in Step S805 is OK, using the random number An, the first phase value By, the SRM, a terminal key B1 included in the copyright protection program Main, the secure device 103 generates an ECDSA (2) using the ECDSA method. Then, encrypting and decrypting unit 508 encrypts the ECDSA (2) using the secure communication key (Step S806).

The secure device 103 transmits the ECDSA (2) via the data transmission and reception unit 502 to the information processing apparatus 102 (Step S807).

The information processing apparatus 102 receives the encrypted ECDSA (2) via the data transmission and reception unit 304. In the information processing apparatus 102, the encrypting and decrypting unit 308 decrypts the encrypted ECDSA (2) using the secure communication key (Step S808).

The information processing apparatus 102 transmits the ECDSA (2) via the data transmission and reception unit 304 to the media server 101a (Step S809).

The media server 101a receives the ECDSA (2) via the data transmission and reception unit 204. In the media server 101a, the encrypting and decrypting unit 508 verifies the ECDSA (2) using the public key A1 in the certificate Acert (Step S810). When the result of verification in Step S810 is NG, the media server 101a returns an error, and terminates the processing.

When the result of verification in Step S810 is OK, the information processing apparatus 102 transmits an Auth key generation request via the data transmission and reception unit 304 to the secure device 103 (Step S811).

The secure device 103 receives the Auth key generation request via the data transmission and reception unit 502. Then, the secure device 103 calculates the random number Bk and the first phase value Av to generate an Auth key (Step S812).

When the result of verification in Step S810 is OK, the copyright protection processing unit 207 in the media server 101a calculates the random number Ak and the first phase value By to generate the Auth key (Step S813).

In the media server 101a, the copyright protection processing unit 207 generates an Exchange key (Step S901).

In the media server 101a, the encrypting and decrypting unit 208 scrambles the Exchange key using the Auth key (Step S902).

The media server 101a transmits the Exchange key via the data transmission and reception unit 204 to the information processing apparatus 102 (Step S903).

The information processing apparatus 102 transmits the Exchange key via the data transmission and reception unit 304. In the information processing apparatus 102, the encrypting and decrypting unit 308 encrypts the Exchange key using the secure communication key (Step S904).

The processing apparatus 102 transmits the Exchange key via the data transmission and reception unit 304 to the secure device 103 (Step S905).

The secure device 103 receives the Exchange key via the data transmission and reception unit 502. In the secure device 103, the encrypting and decrypting unit 508 decrypts the Exchange key using the secure communication key (Step S906).

In the secure device 103, the encrypting and decrypting unit 508 descrambles the Exchange key using the Ruth key (Step S907).

The media server 101a generates a content key based on a predetermined algorithm, and encrypts the content key using the Exchange key (Step S908).

The media server 101a transmits the content key (E) encrypted with the Exchange key via the data transmission and reception unit 204 to the information processing apparatus 102 (Step S909).

The information processing apparatus 102 receives the content key (E) via the data transmission and reception unit 304. In the information processing apparatus 102, the encrypting and decrypting unit 308 encrypts the content key (E) using the secure communication key (Step S910).

The information processing apparatus 102 transmits the content key (ES) encrypted with the Exchange key and the secure communication key via the data transmission and reception unit 304 to the secure device 103 (Step S911).

The secure device 103 receives the content key (ES) encrypted with the Exchange key and the secure communication key via the data transmission and reception unit 502. In the secure device 103, the encrypting and decrypting unit 508 decrypts the content key (ES) using the secure communication key, and further decrypts the content key (E) decrypted with the Exchange key. Further, in the secure device 103, the encrypting and decrypting unit 508 encrypts the content key using the secure communication key (Step S912).

The secure device 103 transmits a content key (S) encrypted with the secure communication key via the data transmission and reception unit 502 to the information processing apparatus 102 (Step S913).

The information processing apparatus 102 receives the content key (S) via the data transmission and reception unit 304. In the information processing apparatus 102, the encrypting and decrypting unit 308 decrypts the content key (S) using the secure communication key (Step S914).

The media server 101a obtains the encrypted content 216 and local content key 215 stored in the storage region 220 via the storage region access unit 206. Further, in the media server 101a, the encrypting and decrypting unit 208 decrypts the encrypted content 216 using the local content key 215. In the media server 101a, the encrypting and decrypting unit 208 encrypts the content using the content key (Step S915).

The media server 101a transmits the content via the data transmission and reception unit 204 to the information processing apparatus 102 (Step S916).

The information processing apparatus 102 receives the content via the data transmission and reception unit 304. Then, the information processing apparatus 102 reproduces the content (Step S917).

In the present embodiment, the data transmitted and received between the information processing apparatus 102 and the secure device 103 is encrypted, but the command (request) is not encrypted. Alternatively, the command may also be encrypted.

Moreover, in reproduction of the content (Step S913) to (Step S915), the content is encrypted in the media server 101a, and decrypted, decoded, and reproduced in the information processing apparatus 102, but not limited to this. For example, the content may be decoded and encrypted in the media server 101a, and the content after decoding may be decrypted and reproduced in the information processing apparatus 102.

Moreover, in Step S602, authentication is executed using the authentication key held in the authentication unit 504 in the secure device 103 in advance and the authentication key embedded in the authentication program 1 executed in the information processing apparatus 102, and the secure communication key is generated, but not limited to this. For example, the encryption communication may be implemented using a method in which the information processing apparatus 102 and the secure device 103 execute pairing using their IDs as initial registration, and simultaneously generate a pair of keys according to the public key cryptosystem and have the keys, or have the keys according to the common key cryptosystem.

Moreover, only the concerned portion (data concerning authentication such as the key and the certificate) is encrypted and decrypted using the secure communication key, but not limited to this. For example, communication between the information processing apparatus 102 and the secure device 103 including the random number generation request, for example, may be executed using a secure path using a secure communication key.

Modification 1 of Embodiment 1

In the present embodiment, an app distribution server 113 may include a converter that generates a copyright protection app including a content reproduction program (first program) and a copyright protection program (second program).

In this case, the program concerning the authentication between the media server 101a and the secure device 103 (information processing apparatus 102) is the second program, which is compiled into the second execution format executable in the secure device 103. The program other than the second program is compiled into the first execution format executable in the information processing apparatus 102. Then, the copyright protection app is generated using a combination of the first program and the second program.

Embodiment 2

Figure 10:
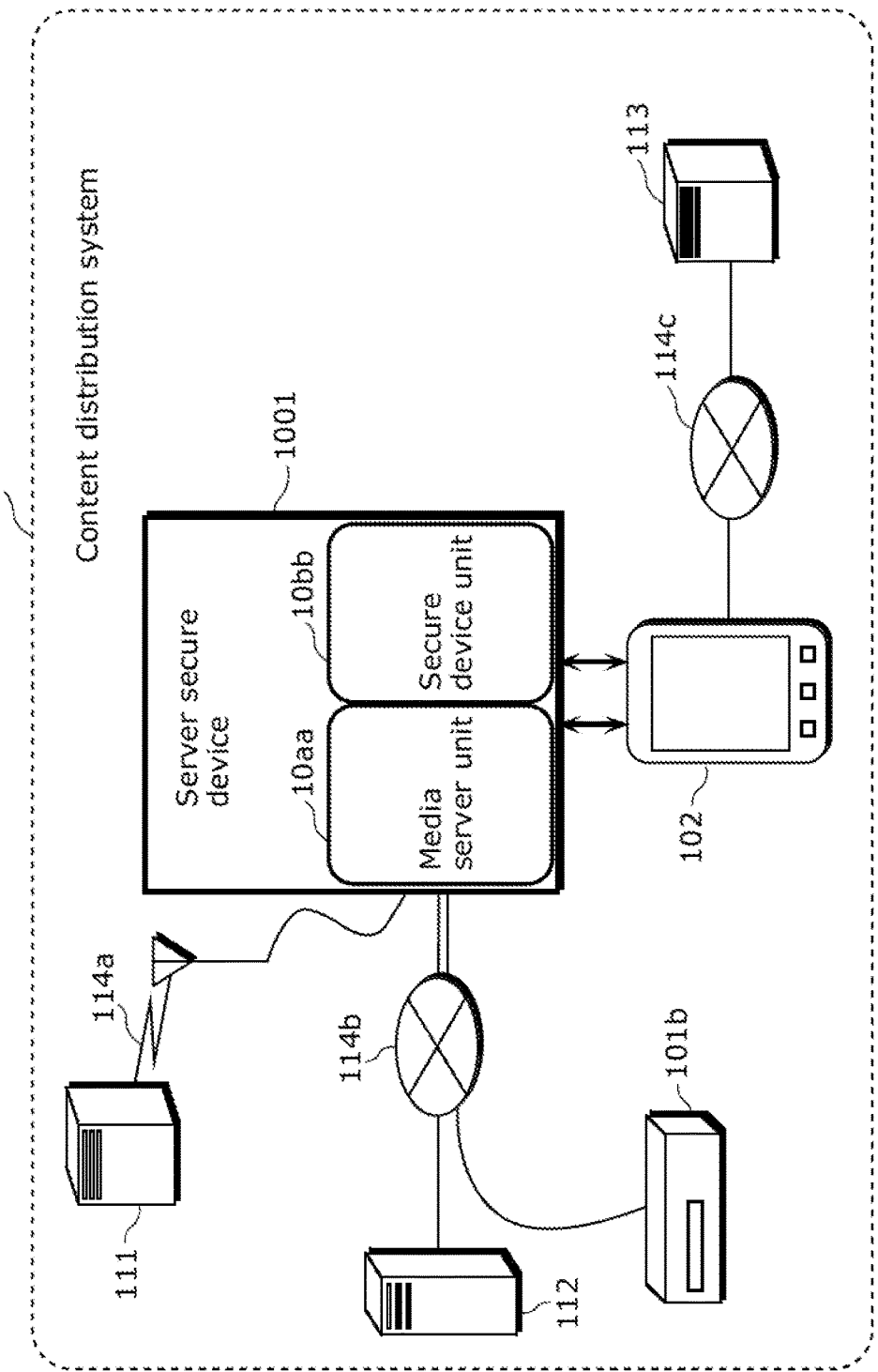
FIG. 10 is a block diagram showing a whole content distribution system according to Embodiment 2.

The configuration and operation of content distribution system according to Embodiment 2 will be described with reference to FIG. 10 to FIG. 14. FIG. 10 is a block diagram showing an example of the content distribution system according to the present embodiment.

Unlike Embodiment 1 in which the media server 101a and the secure device 103 are configured as independent apparatuses, in the content distribution system 1000 according to the present embodiment, the media server 101a and the secure device 103 are integrally configured, and implemented as a server secure device 1001.

As shown in FIG. 10, the content distribution system 1000 according to the present embodiment includes a media server 101b, an information processing apparatus 102, a broadcast station server 111, a Web server 112, an app distribution server 113, and a server secure device 1001.

The media server 101b, the broadcast station server 111, the Web server 112, and the app distribution server 113 have the same configurations as those in Embodiment 1.

The information processing apparatus 102 according to the present embodiment has the same configuration as the information processing apparatus 102 according to Embodiment 1 shown in FIG. 3, but its communication partner is different. Specifically, the information processing apparatus 102 communicates with a media server unit 10aa in the server secure device 1001 while the information processing apparatus 102 according to Embodiment 1 communicates with the media server 101a. Additionally, the information processing apparatus 102 according to the present embodiment communicates with a secure device unit 10bb in the server secure device 1001 while the information processing apparatus 102 according to Embodiment 1 communicates with the secure device 103.

As shown in FIG. 10, the server secure device 1001 includes the media server unit 10aa that receives content from the broadcast station server 111, the Web server 112, or other media server 101b having the same function, and records the content, and the secure device unit 10bb that operates in cooperation with the information processing apparatus 102 when the information processing apparatus 102 executes the processing concerning the concealed data and algorithm related to the copyright protection. The media server unit 10aa has the same configuration as that of the media server 101a according to Embodiment 1, and the secure device function unit 11bb has the same configuration as that of the secure device 103 according to Embodiment 1.

The server secure device 1001 is an apparatus including a processing unit (CPU: Central Processing Unit), a communication unit, and a storage unit such as a portable terminal, a tablet terminal, a mobile phone, an HDD recorder, a DVD/BD recorder, a set top box, a TV, and a game machine.

Figure 11:
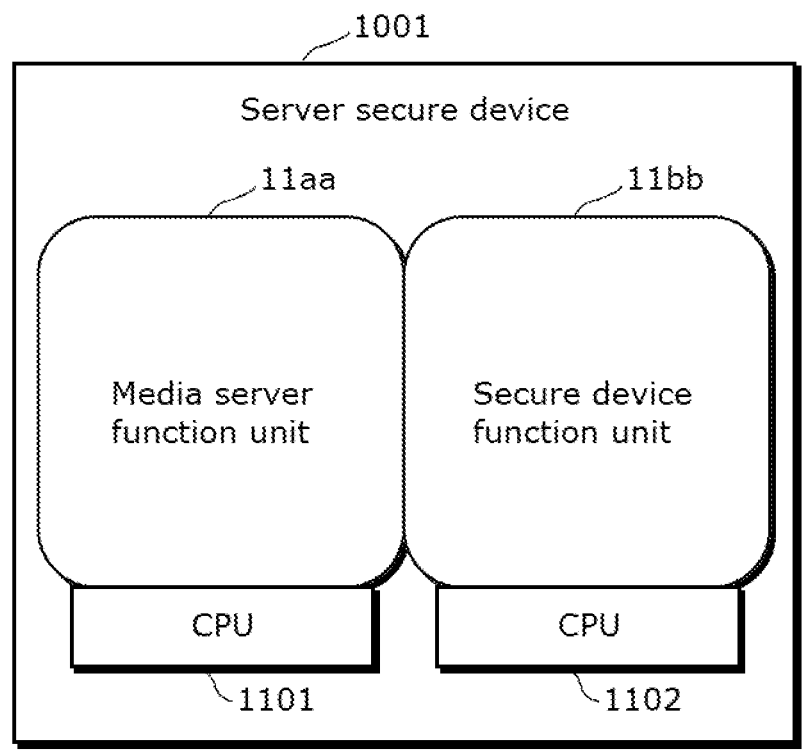
FIG. 11 is a block diagram showing a whole server secure device according to Embodiment 2.

Here, FIG. 11 is a drawing showing a whole configuration of the server secure device 1001 according to Embodiment 2.

As shown in FIG. 11, the server secure device 1001 according to the present embodiment includes two CPUs of a CPU 1101 and a CPU 1102, a media server function unit 11aa, and a secure device function unit 11bb.

The media server function unit 11aa and the secure device function unit 11bb are implemented by a process.

The media server unit 10*aa* is implemented by the media server function unit 11*aa* and the CPU 1101. The secure device unit 10*bb* is implemented by the secure device function unit 11*bb* and the CPU 1102.

The server secure device 1001 further includes an input and output unit and the like not shown in FIG. 11. These are not essential to the present invention, and the description will be omitted. The server secure device 1001 also includes components usually necessary for a computer such as an OS and a RAM other than the CPU. These are not essential to the present invention, and the description will be omitted.

The server secure device 1001 shown in FIG. 11 is implemented to have resistance against analysis from the outside, for example, the terminal itself cannot be connected to a debugger. For example, the analysis is prevented when the processing in the copyright protection processing unit 207 and encrypting and decrypting unit 208 in the media server function unit 11*aa* or the processing in the second app execution unit 503 and the encrypting and decrypting unit 508 in the secure device function unit 11*bb* are being executed. The DL app key 515 is protected by a secure storage region in which the storage region 520 itself is implemented to have access limitation, or protected by encryption.

Moreover, as the method other than implementation of the terminal itself to have resistance, the second program in the DL copyright protection app 315 may have tamper resistance, and a function to assist secure execution of the second program may be installed in the secure hardware that the second app execution unit 503 or secure device function unit 11*bb* has.

Modification 1 of Embodiment 2

Figure 12:
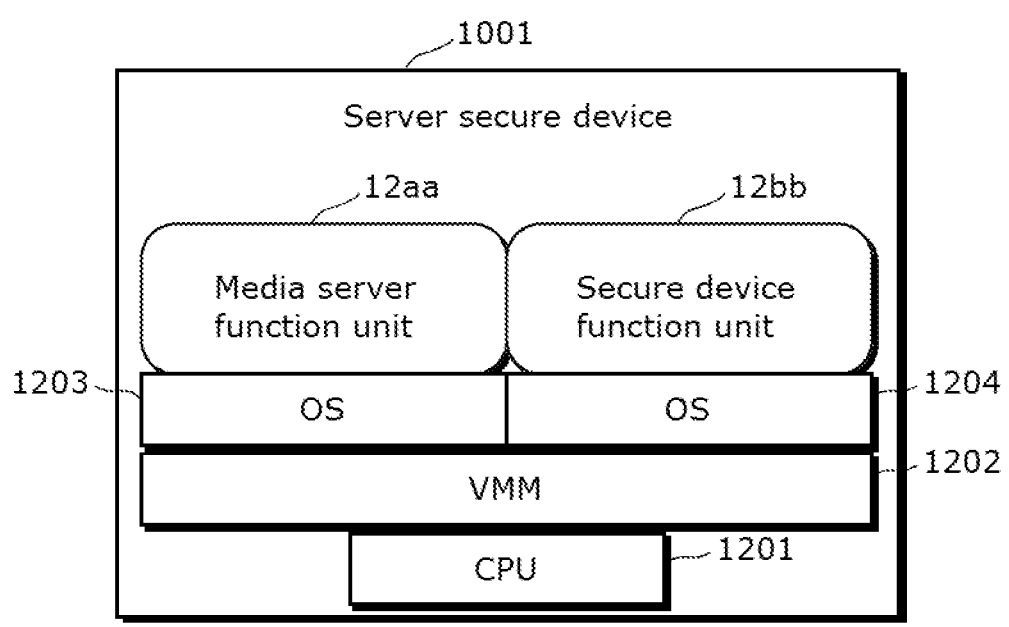
FIG. 12 is a block diagram showing a whole server secure device according to Modification 1 of Embodiment 2.

Modification 1 of the present embodiment will be described with reference to FIG. 12. FIG. 12 is a drawing showing an example of a whole configuration of the server secure device 1001 according to Modification 1 of the present embodiment.

As shown in FIG. 12, the server secure device 1001 according to Modification 1 includes one CPU 1201, a VMM 1202 that is a vertical machine monitor for realizing virtualization of a platform, two OS's of an OS 1203 and an OS 1204, a media server function unit 12*aa*, and a secure device function unit 12*bb*.

The VMM 1202, the OS 1203, the OS 1204, the media server function unit 12*aa*, and the secure device function unit 12*bb* are implemented by a process.

The media server unit 10*aa* shown in FIG. 10 is implemented by the media server function unit 12*aa* that operates on the OS 1203. The secure device unit 10*bb* shown in the FIG. 10 is implemented by the secure device function unit 12*bb* that operates on the OS 1204.

The server secure device 1001 in this Modification further includes an input and output unit and the like not shown in FIG. 12. These are not essential to the present invention, and the description will be omitted. The server secure device 1001 includes components usually necessary for a computer such as a RAM other than the CPU and the OS. These are not essential to the present invention, and the description will be omitted.

The server secure device 1001 shown in FIG. 12 is implemented to have resistance against analysis from the outside, for example, the terminal itself cannot be connected to a debugger. For example, the analysis is prevented when the processing in the copyright protection processing unit 207 and the encrypting and decrypting unit 208 in the media server function unit 12*aa*, or the processing in the second app execution unit 503 and the encrypting and decrypting unit 508 in the secure device function unit 12*bb* is being executed. The DL app key 515 is protected by a secure storage region in which the storage region 520 itself is implemented to have access limitation, or protected by encryption.

Moreover, as the method other than implementation of the terminal itself to have resistance, the second program in the DL copyright protection app 315 may have tamper resistance, and a function to assist secure execution of the second program may be installed in the secure hardware that the second app execution unit 503 or the secure device 103 has.

Modification 2 of Embodiment 2

Figure 13:
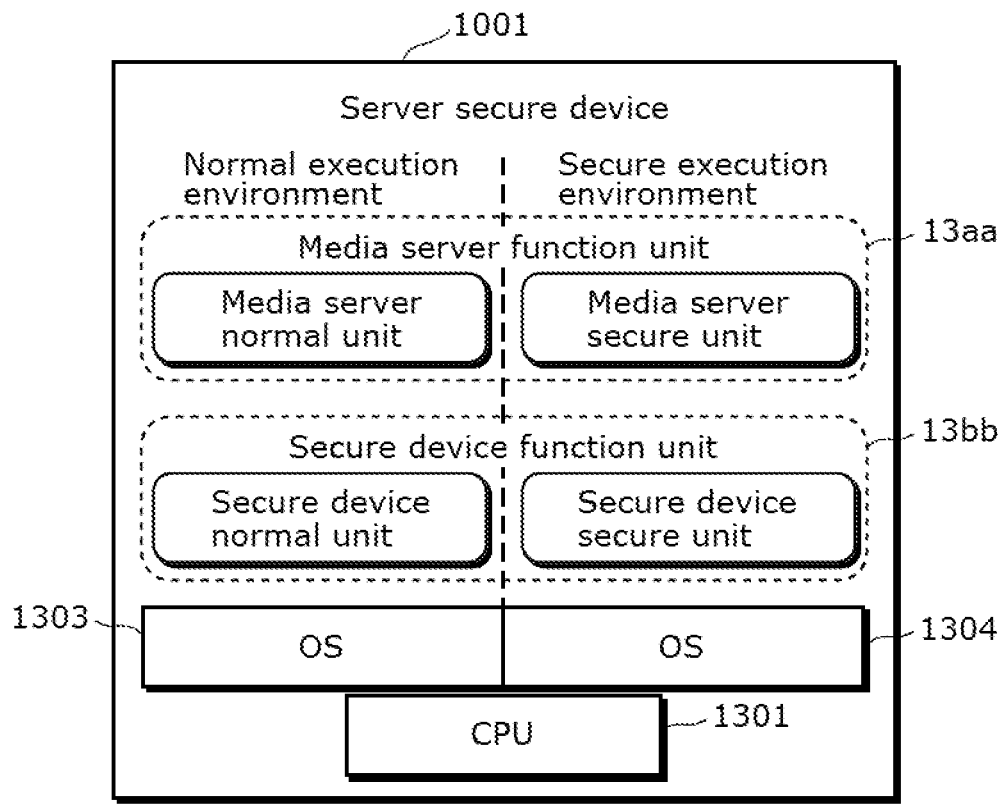
FIG. 13 is a block diagram showing a whole server secure device according to Modification 2 of Embodiment 2.

Modification 2 of the present embodiment will be described with reference to FIG. 13. FIG. 13 is a drawing showing an example of a whole configuration of the server secure device 1001 according to Modification 2 of the present embodiment.

As shown in FIG. 13, the server secure device 1001 according to Modification 2 includes one CPU 1301, two OS 1303 and OS 1304, a media server function unit 12*aa*, and a secure device function unit 12*bb*.

The CPU 1301 has a function to switch the execution mode of the CPU between a normal mode and a secure mode to separate a normal execution environment from a secure execution environment. During execution in the secure execution environment, this provides the resistance against analysis from the outside, for example, the terminal itself cannot be connected to a debugger.

Examples of the CPU having a function to switch the execution mode include CPU's ready for the TrustZone technique of ARM Holdings. The CPU is disclosed in White Paper "ARM Security Technology Building a Secure System using TrustZone Technology" (NPL 3) and others, and the description will be omitted.

The media server unit 10*aa* shown in FIG. 10 is implemented by the media server function unit 13*aa*. The media server function unit 13*aa* includes a media server normal unit that operates on the OS 1303 and has a function that does not demand security, and a media server secure unit that operates on the OS 1304 and has a function that demands security.

The secure device unit 10*bb* shown in the FIG. 10 is implemented by the secure device function unit 13*bb*. The secure device function unit 13*bb* includes a secure device normal unit that operates on the OS 1303 and has a function that does not demand security, and a secure device secure unit that operates on the OS 1304 and has a function that demands security.

The OS 1303, the OS 1304, the media server function unit 13*aa*, and the secure device function unit 13*bb* are implemented by a process.

The server secure device 1001 in this Modification further includes an input and output unit and the like not shown in FIG. 13. These are not essential to the present invention, and the description will be omitted. The server secure device 1001 includes components usually necessary for a computer such as a RAM other than the CPU and the OS. These are not essential to the present invention, and the description will be omitted.

The server secure device 1001 shown in FIG. 13 is implemented to have resistance against analysis from the outside by the CPU that switches the execution mode. In the server secure device 1001 according to this Modification, the analysis is prevented when the processing in the copyright protection processing unit 207 and the encrypting and decrypting unit 208 in the media server secure unit that forms the media server function unit 13aa, or the processing in the second app execution unit 503 and the encrypting and decrypting unit 508 in the secure device secure unit that forms the secure device function unit 13bb is being executed. The DL app key 515 is protected by a secure storage region in which the storage region 520 itself is implemented to have access limitation, or protected by encryption.

Modification 3 of Embodiment 2

Figure 14:
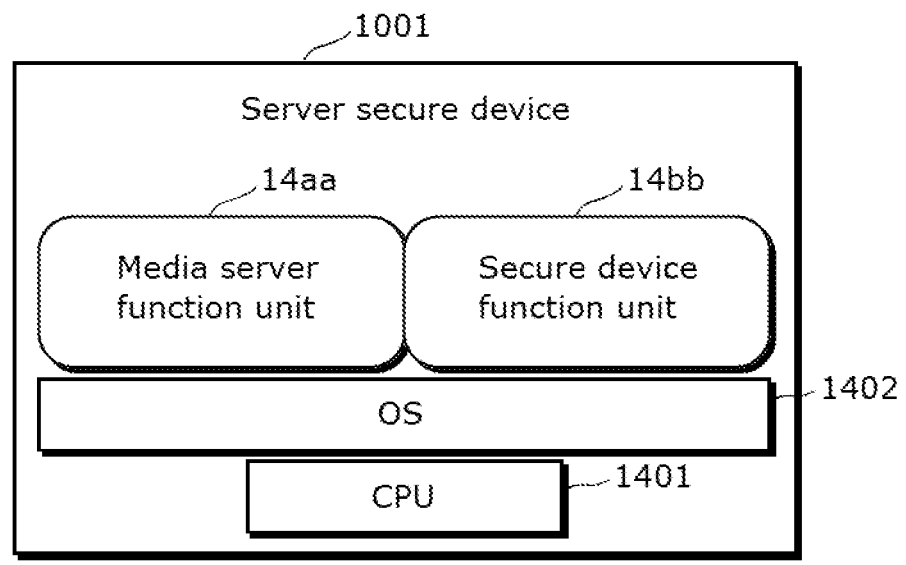
FIG. 14 is a block diagram showing a whole server secure device according to Modification 3 of Embodiment 2.

Modification 3 of the present embodiment will be described with reference to FIG. 14. FIG. 14 is a drawing showing an example of a whole configuration of the server secure device 1001 according to Modification 3 of the present embodiment.

As shown in FIG. 13, the server secure device 1001 according to Modification 3 includes one CPU 1401, one OS 1402, a media server function unit 12aa, and a secure device function unit 12bb. The media server unit 10aa shown in FIG. 10 is implemented by the media server function unit 14aa. The secure device unit 10bb shown in the FIG. 10 is implemented by the secure device function unit 14bb. The OS 1402, the media server function unit 14aa, and the secure device function unit 14bb are implemented by a process. For this reason, the media server function unit 14aa and the secure device function unit 14bb do not interfere with each other.

The server secure device 1001 according to this Modification further includes an input and output unit and the like not shown in FIG. 14. These are not essential to the present invention, and the description will be omitted. The server secure device 1001 according to this Modification includes components usually necessary for a computer such as a RAM other than the CPU and the OS. These are not essential to the present invention, and the description will be omitted.

The server secure device 1001 shown in FIG. 14 is implemented to have resistance against analysis from the outside, for example, the terminal itself cannot be connected to a debugger. For example, the analysis is prevented when the processing in the copyright protection processing unit 207 and the encrypting and decrypting unit 208 in the media server function unit 14aa, or the processing in the second app execution unit 503 and the encrypting and decrypting unit 508 in the secure device function unit 14bb is being executed. The DL app key 515 is protected by a secure storage region in which the storage region 520 itself is implemented to have access limitation, or protected by encryption.

Moreover, as the method other than implementation of the terminal itself to have resistance, the second program in the DL copyright protection app 315 may have tamper resistance, and a function to assist secure execution of the second program may be installed in the secure hardware that the second app execution unit 503 or the secure device 103 has.

Embodiment 3

Figure 15:
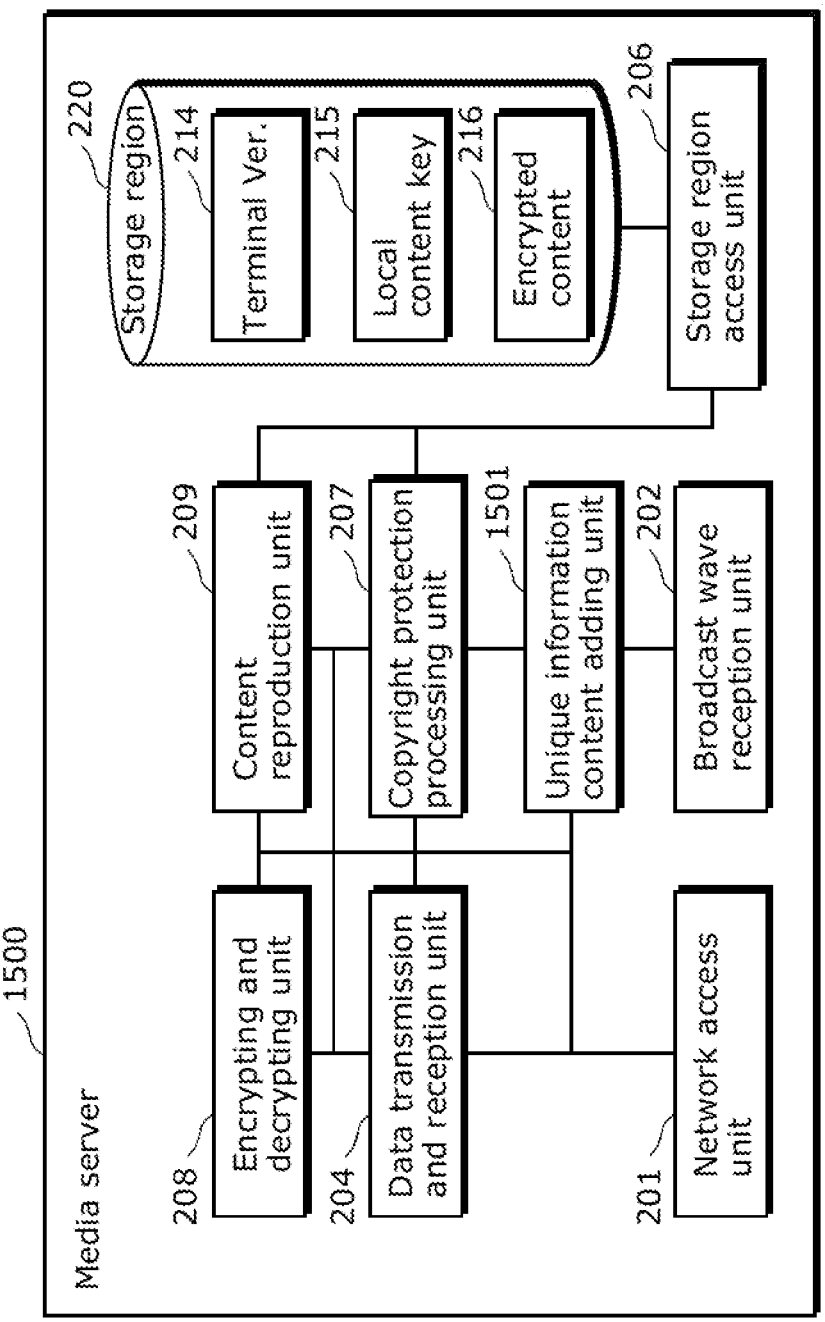
FIG. 15 is a block diagram of a media server according to Embodiment 3.

The configuration and operation of the content distribution system according to Embodiment 3 will be described with reference to FIG. 15. FIG. 15 is a drawing showing a whole configuration of a media server 1500 according to the present embodiment.

Unlike the content distribution system according to Embodiment 1, the content distribution system according to the present embodiment includes a media server having a unique information content adding unit 1501.

Similarly to the content distribution system 100 according to Embodiment 1 shown in FIG. 1, the content distribution system according to the present embodiment includes media servers 101a and 101b, an information processing apparatus 102, a secure device 103, a broadcast station server 111, a Web server 112, and an app distribution server 113. The information processing apparatus 102, the secure device 103, the broadcast station server 111, the Web server 112, and the app distribution server 113 have the same configurations as those in content distribution system 100 according to Embodiment 1.

The media server 101a according to the present embodiment is a media server 1500 shown in FIG. 15, and is an apparatus having a communication unit and a storage unit such as an HDD recorder, a DVD/BD recorder, a set top box, a portable terminal, a tablet terminal, a mobile phone, a TV, or a game machine, for example.

As shown in FIG. 15, the media server 1500 includes a network access unit 201, a broadcast wave reception unit 202, a data transmission and reception unit 204, a storage region access unit 206, a copyright protection processing unit 207, and an encrypting and decrypting unit 208, a content reproduction unit 209, a storage region 220, and the unique information content adding unit 1501. The network access unit 201, the broadcast wave reception unit 202, the data transmission and reception unit 204, the storage region access unit 206, the copyright protection processing unit 207, the encrypting and decrypting unit 208, the content reproduction unit 209, and the storage region 220 have the same configurations as those in Embodiment 1.

When the copyright protection processing unit 207 transmits content to the information processing apparatus 102, the unique information content adding unit 1501 adds the information unique to the media server 101a or the information processing apparatus 102 to a position that does not influence reproduction, such as the header information of the content.

For example, the unique information is a telephone number, a Globally Unique Identifier (GUID), a Universally Unique Identifier (UUID), a mail address, a MAC address, an International Mobile Equipment Identity (IMEI), or composite information thereof.

The unique information content adding unit 1501 may include a unique information key added and managed by a manufacturer that manufactures the media server 101a, and the unique information may be encrypted using the unique information key.

By a configuration that allows the unique information to be added to the content, the apparatus through which the content passes can be identified. In this case, even if unauthorized copy or the like is performed, an apparatus in which such an unauthorized act is performed can be narrowed from the history of the content passed. This facilitates countermeasures against the unauthorized copy.

Other Modifications

The present invention has been described based on the embodiments above, but the present invention will not be limited to the embodiments. The following cases are also included in the present invention.

(1) The respective apparatuses and devices are specifically a computer system including a microprocessor, a ROM, a RAM, a hard disk unit, a display unit, a keyboard, and a mouse. The RAM or the hard disk unit stores a computer program. When the microprocessor operates according to the computer program, the apparatuses and devices attain their functions. Here, in order to attain a predetermined function, the computer program is composed of a combination of several command codes indicating instructions to a computer.

(2) Part or all of the apparatuses and devices may be composed of a single system Large Scale Integrated Circuit (LSI). The system LSI is an ultra multifunctional LSI produced by integrating a plurality of component units on a single chip. Specifically, the system LSI is a computer system including a microprocessor, a ROM, and a RAM. The RAM stores a computer program. When the microprocessor operates according to the computer program, the system LSI attains its function.

The system LSI may be referred to as an IC, an LSI, a super LSI, and an ultra LSI depending on the difference in integration density. The system LSI having such integration density is also included in the present invention. Alternatively, the Field Programmable Gate Array (FPGA) which is programmable after building the LSI, or the reconfigurable processor which allows connection and setting of a circuit cell within the LSI to be reconfigured may be used.

Further, if progression of the semiconductor technique or derivation of another technique leads to a new technique for a highly integrated circuit which is to be substituted for the LSI, integration of components may be performed using the technique. Bio techniques may be applied.

(3) Part or all of the components that form the apparatuses and devices may be composed of an IC card or a single module that can be attached to and detached from each of the apparatuses and devices. The IC card or the module is a computer system including a microprocessor, a ROM, and a RAM. The IC card or the module may include the ultra multifunctional LSI. The IC card or module attains the function when the microprocessor operates according to the computer program. The IC card or the module may have tamper resistance.

(4) The present, invention may be the method described above. Alternatively, the present invention may be a computer program for causing a computer to implement the method as the processing of a CPU, or may be digital signals composed of the computer program.

Moreover, the present invention may be the computer program or the digital signals stored in a computer-readable recording medium such as a flexible disk, a hard disk, a CD-ROM, an MO, a DVD, a DVD-ROM, a DVD-RAM, a Blu-ray Disc (BD), and a semiconductor memory. Alternatively, the present invention may be the digital signals recorded in these recording media.

Moreover, the present invention may be the computer program or digital signals transmitted via an electric communications line, a wireless or wired communications line, a network such as the Internet, or data broadcasting.

Moreover, the present invention may be a computer system including a microprocessor and a memory, in which the memory stores the computer program, and the microprocessor operates according to the computer program.

Alternatively, the present invention may be implemented by an independent other computer system by storing the program or the digital signals in the recording medium and transporting the recording medium or by transporting the program or the digital signals via the network or the like.

(5) The present invention may be combinations of the embodiments and modifications thereof.

INDUSTRIAL APPLICABILITY

The content distribution system described above can be used as a content distribution system including an incorporated apparatus that can use the app distribution system (information processing apparatus). Moreover, the secure device, the information processing terminal (information processing apparatus), and the media server each can be implemented as the components of the content distribution system.

Moreover, the content distribution system allows implementation of the copyright protection standards also in an incorporated terminal having the app distribution system. Further, a configuration that allows adding of the unique information can identify an unauthorized user or facilitate its identification even if the unauthorized user maliciously cancels the implemented copyright protection to cause leakage of content.

REFERENCE SIGNS LIST

100 Content distribution system
101a, 101b Media server
102 Information processing apparatus
103 Secure device
111 Broadcast station server
112 Web server
113 App distribution server
201 Network access unit
202 Broadcast wave reception unit
204 Data transmission and reception unit
206 Storage region access unit
207 Copyright protection processing unit
208 Encrypting and decrypting unit
209 Content reproduction unit
214 Terminal Ver.
215 Local content key
216 Encrypted content
220 Storage region
301 Network access unit
302 App DL unit
304 Data transmission and reception unit
306 Storage region access unit
307 First app execution unit
308 Encrypting and decrypting unit
314 PF Ver.
315 DL copyright protection app
320 Storage region
501 Network access unit
502 Data transmission and reception unit
503 Second app execution unit
504 Authentication unit
506 Storage region access unit
508 Encrypting and decrypting unit
515 DL app key
520 Storage region
1000 Content distribution system
1001 Server secure device
10aa Media server unit
10bb Secure device unit
1101 CPU
1102 CPU
11aa Media server function unit
11bb Secure device function unit
1201 CPU
1202 VMM
1203 OS 1204 OS
12aa Media server function unit
12bb Secure device function unit
1301 CPU
1303 OS
1304 OS
13aa Media server function unit
13bb Secure device function unit
1401 CPU
1402 OS
14aa Media server function unit
14bb Secure device function unit
1500 Media server
1501 Unique information content adding unit

The invention claimed is:

1. An information processing apparatus which reproduces a predetermined content, the information processing apparatus comprising:
an application storing unit configured to store a copyright protection application program including a first program having a first execution format executable in the information processing apparatus and a second program having a second execution format different from the first execution format and executable in a secure device, the second program being encrypted with a program key held in the secure device, the first program and the second program being different from the content; and
an application execution unit configured to (i) extract the second program in the copyright protection application program by extracting and executing the first program in the copyright protection application program and (ii) transmit, via a network, the second program to the secure device,
wherein the application execution unit is configured to (i) receive the content from a media server and (ii) execute reproduction processing to reproduce the content by executing the first program when authentication between the secure device and the media server is completed successfully by using the second program,
wherein the secure device (i) receives, via the network, the second program from the information processing device, (ii) decrypts the second program using the program key, and (iii) executes the decrypted second program to perform the authentication between the secure device and the media server,
wherein the media server (i) establishes a communication path enabling secure exchange of the content between the media server and the first program to be executed in the information processing apparatus and (ii) distributes, via the established communication path, the content to the information processing apparatus when the authentication between the secure device and the media server is completed successfully, and
wherein (i) the information processing apparatus, the secure device, and the media server are independent apparatuses in a content distribution system and (ii) the information processing apparatus, the secure device, and the media server are connected via the network.

2. A secure device which executes authentication with a media server which distributes a content, the secure device comprising:
a reception unit configured to receive, via a network, a second program included in a copyright protection application program from an information processing apparatus, the copyright protection application program including a first program having a first execution format executable in the information processing apparatus and the second program, the second program having a second execution format different from the first execution format, the second program being executable in the secure device, the second program being encrypted with a program key held by the secure device, the first program and the second program being different from the content;
a key storing unit configured to store the program key; and
an application execution unit configured to decrypt the second program using the program key, and execute the decrypted second program,
wherein the application execution unit is configured to execute authentication between the application execution unit and a media server using authentication information of the information processing apparatus by executing the second program,
wherein the information processing device (i) extracts the second program in the copyright protection application program by extracting and executing the first program in the copyright protection application program, (ii) transmits, via the network, the second program to the reception unit, (iii) receives the content from the media server, and (iv) executes reproduction processing to reproduce the content by executing the first program when authentication between the application execution unit and the media server is completed successfully by using the second program,
wherein the media server (i) establishes a communication path enabling secure exchange of the content between the media server and the first program to be executed in the information processing apparatus and (ii) distributes, via the established communication path, the content to the information processing apparatus when the authentication between the application execution unit and the media server is completed successfully, and
wherein (i) the information processing apparatus, the secure device, and the media server are independent apparatuses in a content distribution system and (ii) the information processing apparatus, the secure device, and the media server are connected via the network.

3. The secure device according to claim 2,
wherein the secure device includes no connection unit configured to allow physical connection to an analysis tool that analyzes operation of the key storing unit and the application execution unit.

4. The secure device according to claim 2,
wherein the second program has tamper resistance.

5. A server secure device which communicates with an information processing apparatus which reproduces a predetermined content, the server secure device comprising:
a media server which distributes, via a network, the content to the information processing apparatus; and
a secure device which operates in cooperation with the information processing apparatus,
wherein the secure device includes:
a reception unit configured to receive, via the network, a second program included in a copyright protection application program from the information processing apparatus, the copyright protection application program including a first program having a first execution format executable in the information processing apparatus and the second program, the second program having a second execution format different from the first execution format, the second program being executable in the secure device, the second program being encrypted with a program key held by the secure device, the first program and the second program being different from the content;
a key storing unit configured to store the program key; and
an application execution unit configured to decrypt the second program using the program key, and execute the decrypted second program,
wherein the application execution unit is configured to execute authentication between the application execution unit and the media server using authentication information of the information processing apparatus by executing the second program,
wherein the media server includes:
a copyright protection processing unit configured to establish a communication path enabling secure exchange of the content between the media server and the first program to be executed in the information processing apparatus;
a storage region which stores the content; and
a data transmission and reception unit configured to transmit, via the established communication path, the content to the information processing apparatus,
wherein the information processing device (i) extracts the second program in the copyright protection application program by extracting and executing the first program in the copyright protection application program, (ii) transmits, via the network, the second program to the reception unit, (iii) receives the content from the data transmission and reception unit, and (iv) executes reproduction processing to reproduce the content by executing the first program when authentication between the application execution unit and the media server is completed successfully by using the second program, and
wherein (i) the information processing apparatus and the server secure device are independent apparatuses in a content distribution system and (ii) the information processing apparatus and the server secure device are connected via the network.

6. A media server which distributes content to an information processing apparatus which reproduces predetermined content, the media server comprising:
a copyright protection processing unit configured to (i) execute authentication between the media server and a second program to be executed in the secure device and (ii) establish a communication path enabling secure exchange of content between the media server and a first program to be executed in the information processing apparatus, wherein the first program and the second program are included in a copyright protection application program, the first program having a first execution format executable in the information processing apparatus, and the second program having a second execution format different from the first execution format and executable in a secure device which operates in cooperation with the information processing apparatus, the second program being encrypted with a program key held in the secure device;
a storage region which stores the content;
a unique information content adding unit configured to add information unique to the media server to the content; and
a data transmission and reception unit configured to (i) encrypt the content to which the unique information is added and (ii) transmit, via the established communication path, the encrypted content to the information processing apparatus,
wherein the secure device (i) receives, via the network, the second program from the information processing device, (ii) decrypts the second program using the program key, and (iii) executes the decrypted second program to perform the authentication between the secure device and the media server,
wherein the information processing device (i) extracts the second program in the copyright protection application program by extracting and executing the first program in the copyright protection application program, (ii) transmits, via the network, the second program to the reception unit, (iii) receives the content from the data transmission and reception unit, and (iv) executes reproduction processing to reproduce the content by executing the first program when the authentication between the application execution unit and the media server is completed successfully by using the second program, and
wherein (i) the information processing apparatus, the secure device, and the media server are independent apparatuses in a content distribution system and (ii) the information processing apparatus, the secure device, and the media server are connected via the network.

7. The media server according to claim 6, further comprising:
a copyright protection processing unit configured to establish a communication path enabling secure exchange of the content between the media server and the first program to be executed in the information processing apparatus.

8. The media server according to claim 6,
wherein the copyright protection processing unit has tamper resistance.

9. A method for use by an information processing apparatus which reproduces a predetermined content, the information processing apparatus storing a copyright protection application program including a first program having a first execution format executable in the information processing apparatus and a second program having a second execution format different from the first execution format and executable in a secure device, the second program being encrypted with a program key held in the secure device, the first program and the second program being different from the content, the method comprising:
(i) extracting the second program in the copyright protection application program by extracting and executing the first program in the copyright protection application program and (ii) transmitting, via a network, the second program to the secure device; and
(i) receiving the content from a media server and (ii) executing reproduction processing to reproduce the content by executing the first program when authentication between the secure device and the media server is completed successfully by using the second program,
wherein the secure device (i) receives, via the network, the second program from the information processing device, (ii) decrypts the second program using the program key, and (iii) executes the decrypted second program to perform the authentication between the secure device and the media server,
wherein the media server (i) establishes a communication path enabling secure exchange of the content between the media server and the first program to be executed in the information processing apparatus and (ii) distributes, via the established communication path, the content to the information processing apparatus when the authentication between the secure device and the media server is completed successfully, and wherein (i) the information processing apparatus, the secure device, and the media server are independent apparatuses in a content distribution system and (ii) the information processing apparatus, the secure device, and the media server are connected via the network.

10. A method for use in a secure device which executes authentication with a media server which distributes a content, the secure device storing a program key, the method comprising:

receiving, via a network, a second program included in a copyright protection application program from an information processing apparatus, the copyright protection application program including a first program having a first execution format executable in the information processing apparatus and the second program, the second program having a second execution format different from the first execution format, the second program being executable in the secure device, the second program being encrypted with the program key held by the secure device, the first program and the second program being different from the content;

decrypting the second program using the program key; and executing authentication between the secure device and a media server using authentication information of the information processing apparatus by executing the second program, wherein the information processing device (i) extracts the second program in the copyright protection application program by extracting and executing the first program in the copyright protection application program, (ii) transmits, via the network, the second program to the secure device, (iii) receives the content from the media server, and (iv) executes reproduction processing to reproduce the content by executing the first program when the authentication between the application execution unit and the media server is completed successfully, wherein the media server (i) establishes a communication path enabling secure exchange of the content between the media server and the first program to be executed in the information processing apparatus and (ii) distributes, via the established communication path, the content to the information processing apparatus when the authentication between the application execution unit and the media server is completed successfully, and wherein (i) the information processing apparatus, the secure device, and the media server are independent apparatuses in a content distribution system and (ii) the information processing apparatus, the secure device, and the media server are connected via the network.

11. A method for use in a server secure device which communicates with an information processing apparatus which reproduces a predetermined content, the server secure device including (i) a media server which distributes, via a network, the content to the information processing apparatus and (ii) a secure device which operates in cooperation with the information processing apparatus, the secure device storing a program key, the media server storing the content, the method comprising:

receiving, via a network using the secure device, a second program included in a copyright protection application program from the information processing apparatus, the copyright protection application program including a first program having a first execution format executable in the information processing apparatus and the second program, the second program having a second execution format different from the first execution format, the second program being executable in the secure device, the second program being encrypted with the program key held by the secure device, the first program and the second program being different from the content;

decrypting, using the secure device, the second program using the program key;

executing, using the secure device authentication between the secure device and the media server using authentication information of the information processing apparatus by executing the second program;

establishing, using the media server, a communication path enabling secure exchange of the content between the media server and the first program to be executed in the information processing apparatus; and transmitting, via the established communication path using the media server, the content to the information processing apparatus;

wherein the information processing device (i) extracts the second program in the copyright protection application program by extracting and executing the first program in the copyright protection application program, (ii) transmits, via the network, the second program to the secure device, (iii) receives the content from the media server, and (iv) executes reproduction processing to reproduce the content by executing the first program when the authentication between the application execution unit and the media server is completed successfully, and wherein (i) the information processing apparatus and the server secure device are independent apparatuses in a content distribution system and (ii) the information processing apparatus and the server secure device are connected via the network.

12. A method for use in a media server which distributes content to an information processing apparatus which reproduces predetermined content, the media server storing the content, the method comprising:

(i) executing authentication between the media server and a second program to be executed in the secure device and (ii) establishing a communication path enabling secure exchange of content between the media server and a first program to be executed in the information processing apparatus, wherein the first program and the second program are included in a copyright protection application program, the first program having a first execution format executable in the information processing apparatus, and the second program having a second execution format different from the first execution format and executable in a secure device which operates in cooperation with the information processing apparatus, the second program being encrypted with a program key held in the secure device;

adding information unique to the media server to the content; and (i) encrypting the content to which the unique information is added and (ii) transmitting, via the established communication path, the encrypted content to the information processing apparatus, wherein the secure device (i) receives, via the network, the second program from the information processing device, (ii) decrypts the second program using the program key, and (iii) executes the decrypted second program to perform the authentication between the secure device and the media server, wherein the information processing device (i) extracts the second program in the copyright protection application program by extracting and executing the first program in the copyright protection application program, (ii) transmits, via the network, the second program to the reception unit, (iii) receives the content from the data transmission and reception unit, and (iv) executes reproduction processing to reproduce the content by executing the first program when the authentication between the application execution unit and the media server is completed successfully by using the second program, and wherein (i) the information processing apparatus, the secure device, and the media server are independent apparatuses in a content distribution system and (ii) the information processing apparatus, the secure device, and the media server are connected via the network.

* * * * *